(12) United States Patent
Tsukamoto

(10) Patent No.: US 8,797,349 B2
(45) Date of Patent: Aug. 5, 2014

(54) IMAGE PROCESSING APPARATUS AND IMAGE PROCESSING METHOD

(75) Inventor: Akihiro Tsukamoto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 62 days.

(21) Appl. No.: 13/091,366

(22) Filed: Apr. 21, 2011

(65) Prior Publication Data

US 2011/0261066 A1 Oct. 27, 2011

(30) Foreign Application Priority Data

Apr. 23, 2010 (JP) ................................ 2010-099803
May 28, 2010 (JP) ................................ 2010-123264
Jan. 25, 2011 (JP) ................................ 2011-013100

(51) Int. Cl.
*G09G 5/00* (2006.01)
*G09G 5/02* (2006.01)

(52) U.S. Cl.
USPC .......................................... 345/619; 345/589

(58) Field of Classification Search
CPC .......... H04N 1/00453; H04N 1/00461; H04N 1/00458; G06F 3/0485
See application file for complete search history.

(56) References Cited

U.S. PATENT DOCUMENTS

| | | | | |
|---|---|---|---|---|
| 7,706,631 | B2 * | 4/2010 | Slatter | 382/284 |
| 8,581,928 | B2 | 11/2013 | Watari et al. | |
| 2001/0006425 | A1 * | 7/2001 | Takamori et al. | 358/530 |
| 2004/0015491 | A1 * | 1/2004 | Brown et al. | 707/3 |
| 2008/0214146 | A1 * | 9/2008 | Lincoln et al. | 455/412.1 |
| 2008/0316518 | A1 * | 12/2008 | Watari et al. | 358/1.13 |
| 2009/0319897 | A1 * | 12/2009 | Kotler et al. | 715/711 |
| 2014/0071490 | A1 | 3/2014 | Watari et al. | |

FOREIGN PATENT DOCUMENTS

| | | |
|---|---|---|
| CN | 101330558 A | 12/2008 |
| CN | 101355624 A | 1/2009 |
| JP | 8-44867 A | 2/1996 |
| JP | 9-258709 A | 10/1997 |
| JP | 2000-232542 A | 8/2000 |
| JP | 2000232542 A * | 8/2000 |
| JP | 2003-316559 A | 11/2003 |
| JP | 2003316559 A * | 11/2003 |
| JP | 2004-213598 A | 7/2004 |
| JP | 2004-258955 A | 9/2004 |

(Continued)

OTHER PUBLICATIONS

Japan Electronic Industry Development Association. "Digital Still Camera Image File Format Standard, Exchangeable Image File Format for Digital Still Cameras: Exif", Version 2.1, Jun. 12, 1998.*

(Continued)

*Primary Examiner* — Kee M Tung
*Assistant Examiner* — Nicholas R Wilson
(74) *Attorney, Agent, or Firm* — Holtz Holtz Goodman & Chick PC

(57) ABSTRACT

An image processing apparatus comprises a storage configured to store original images, a display configured to display reduced images of the original images, a specifying unit configured to specify one of the reduced images displayed on the display, and a processor configured to convert the one of the reduced images specified by the specifying unit into an artwork. The processor is configured to convert the one of the reduced images into an artwork of a different tone every time the specifying unit specifies the one of the reduced images, and the display displays the artwork from the processor.

11 Claims, 25 Drawing Sheets

(56) References Cited

FOREIGN PATENT DOCUMENTS

| JP | 2004-265314 A | 9/2004 |
|----|---------------|--------|
| JP | 2006-285745 A | 10/2006 |
| JP | 2007-104322 A | 4/2007 |
| JP | 2008-204474 A | 9/2008 |
| JP | 2009-003689 A | 1/2009 |
| JP | 2009-141678 A | 6/2009 |
| JP | 2009-284326 A | 12/2009 |
| WO | WO 2009/142294 A | 11/2009 |

OTHER PUBLICATIONS

Eastman Kodak Company. "FlashPix Format Specification", Version 1.0, Sep. 11, 1996.*

Japanese Office Action dated Mar. 13, 2012 (and English translation thereof) in counterpart Japanese Application No. 2011-013100.

Munechika Nishida: "Paint Shop Pro 9", P & A, Asahi Personal Computer, No. 370, ap, Japan, The Asahi Shimbun Company, Nov. 15, 2004, No. 370, p. 107.

Nozomu Aso: "IE4 Coming Up, The Windows", vol. 7, No, 9, Japan, Softbank Corp., Sep. 1, 1997, vol. 7, No. 9, pp. 112-115.

Fumihiko Shibata: "30-minute play!, Cocoa", Mac People, vol. 14, No. 4, Ascii Corp., Apr. 1, 2008, vol. 14, No. 4, pp. 154-155.

"Top pick free software and Extremely standard shareware. It's your turn, online software! 120", Nikkei Click, vol. 7, No. 9, Japan, Nikkei Business Publications Inc., Jul. 8, 2000, vol. 7, No. 9, pp. 64-67.

Japanese Office Action dated May 22, 2012 (and English translation thereof) in counterpart Japanese Application No. 2010-123264.

Chinese Office Action dated Nov. 26, 2012 (and English translation thereof) in counterpart Chinese Application No. 201110104368,9.

Chinese Office Action dated Feb. 19, 2014 (and English translation thereof) in counterpart Chinese Application No. 201110104368.9.

* cited by examiner

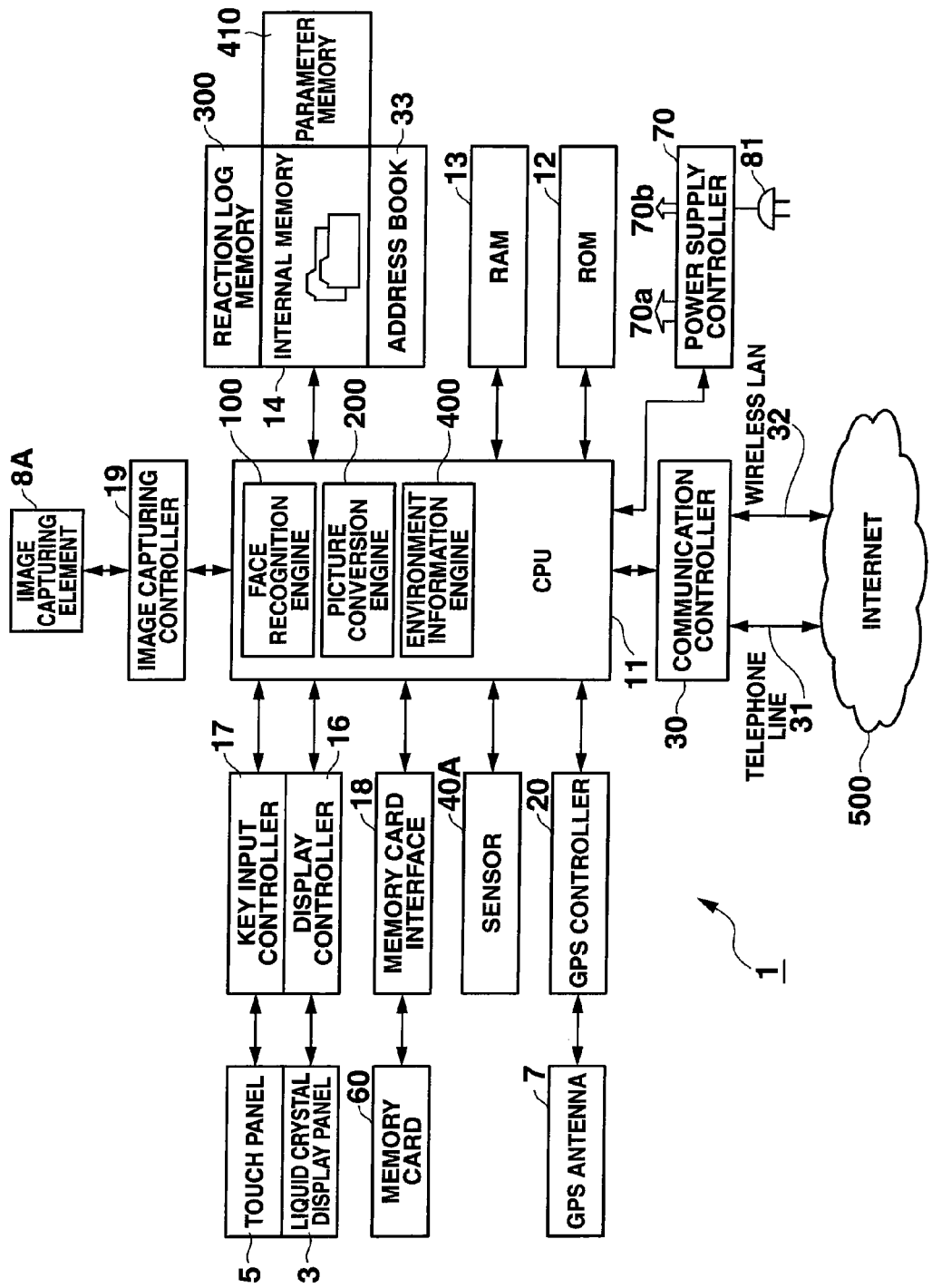

IMAGE PROCESSING APPARATUS AND IMAGE PROCESSING METHOD

CROSS-REFERENCE TO RELATED APPLICATIONS

This application is based upon and claims the benefit of priority from prior Japanese Patent Applications No. 2010-099803, filed Apr. 23, 2010; No. 2010-123264, filed May 28, 2010; and No. 2011-013100, filed Jan. 25, 2011, the entire contents of all of which are incorporated herein by reference.

BACKGROUND OF THE INVENTION

1. Field of the Invention

The present invention relates generally to an image processing apparatus and image processing method for changing a tone of an image.

2. Description of the Related Art

In recent years, digital cameras are widely available, and digital photographs are usually saved as digital image data. For example, images can be viewed on a digital camera or image data can be loaded to a personal computer and images can be viewed on the personal computer. As described above, users can enjoy digital photographs in various ways. For example, a technique (picture conversion technique) has been suggested to apply image processing to image data so as to change a tone of a digital photograph in order to convert the digital photograph to works of fine art (for example, oil painting or water color painting) based on the original picture and display the converted artwork (see Jpn. Pat. Appln. KOKAI Publication No. H08-44867).

In the picture conversion, a tone of each piece of pixel data representing an image such as a digital photograph is changed according to a predetermined algorithm (picture conversion algorithm), whereby the picture is converted to an artwork of various styles.

When the original image can be converted to the artwork of various styles as described above, the artwork images are required to be displayed so that the artwork images can be seen at a glance. In this circumstance, a technique for displaying a list of different kinds of reduced images (thumbnail images) has been proposed (see Jpn. Pat. Appln. KOKAI Publication No. 2009-284326).

In principle, the picture conversion is the same as effect processing for brightness-controlling, sharpening, and softening an image, for example. An image appearing to be an artwork may be obtained if the effect processing is manually applied by trial-and-error and significant efforts have been made for many hours. In contrast, the picture conversion algorithm is a sophisticated programmed conversion algorithm. For example, features such as color information and brush feel information are extracted from an original picture such as an oil painting and a pastel drawing drawn/painted by a real artist, and the extracted features are made into parameters and incorporated into the conversion algorithm.

In the conversion algorithm, a parameter group P is prepared in advance. The parameter group P is a set of the parameters (picture conversion parameters) for changing a tone of the original image. When there are 12 styles of artworks, the parameter groups for the artworks are denoted with P(1) to P(12). Each of the parameter group includes plural parameters.

A parameter is an element for applying effect processing to a pixel. In other words, a pixel is usually represented by a level having multiple bits in each of RGB colors, and the parameter is an element for applying computation to the bit data. A specific example will be explained below. For example, when a red component is emphasized, and green and blue components are slightly reduced, the following arithmetic operation is performed: R×2, G×0.9, and B×0.5. In this case, "2", "0.9", and "0.5" are parameters for changing a color of the image. Alternatively, for example, when arithmetic operations are programmed in advance, the following arithmetic operation is performed: R×1.1 is calculated where the degree of emphasis of red is 1, R×1.2 is calculated where the degree of emphasis of red is 2, and R×1.3 is calculated where the degree of emphasis of red is 3. In this case, the degree of emphasis is also a parameter.

Still alternatively, a predetermined arithmetic operation may be performed using not only target pixels (such as pixels in a face region) but also pixels adjacent to the target pixels. For example, it is assumed that pixels A1(R, G, B), A2(R, G, B), A3(R, G, B), A4(R, G, B), A5(R, G, B), A6(R, G, B), A7(R, G, B), A8(R, G, B), A9(R, G, B) are arranged at the left, right, top, and bottom with respect to the pixel of interest A5(R, G, B) in the center. For A5(R), the following arithmetic operation is performed: A5(R)=A1(R)×q1+A2(R)×q2+A3(R)×q3+A4(R)×q4+A5(R)×q5+A6(R)×q6+A7(R)×q7+A8(R)×q8+A9(R)×q9. The same computation as the above is also performed for each of G and B. In this case, q1 to q9 are parameters. When these values (coefficients) are changed, different effect processing can be achieved.

However, examples of an artwork obtained by the picture conversion include many styles of images such as oil painting image, water-color painting image, or pastel drawing image. For example, a CPU needs to perform arithmetic operation on ROB data having 12 million pixels in order to perform the above conversion processing. Therefore, the CPU has to perform a large amount of computation, and it takes a long time to perform the conversion processing.

Moreover, since it takes a long time to perform the conversion processing, it is difficult to instantly try various conversions to select a converted image of the most suitable artwork style.

BRIEF SUMMARY OF THE INVENTION

It is an object of the present invention to provide an image processing apparatus and an image processing method which allow a user to see a converted image in a short time.

According to an embodiment, an image processing apparatus comprises:

a storage configured to store original images;

a display configured to display reduced images of the original images;

a specifying unit configured to specify one of the reduced images displayed on the display; and a processor configured to change a tone the one of the reduced images specified by the specifying unit, wherein the processor is configured to change the tone of the reduced images to a different tone every time the specifying unit specifies the one of the reduced images, and the display is configured to display a tone-changed reduced image.

According to another embodiment, an image processing method comprises:

displaying reduced images of original images;

specifying one of the displayed reduced images;

changing a tone of a specified reduced image to a different tone every time the one of the reduced images is specified, and displaying a tone-changed reduced image.

According to another embodiment, an image processing apparatus comprises:

a storage configured to store original images;
a display;
a first display controller configured to display, on the display, reduced images of the original images;
a processor configured to, in response to an operation for specifying one of the reduced images displayed on the display, change a tone of a specified one of the reduced images to a different tone;
a second display controller configured to display, on the display, a tone-changed reduced image in place of the specified one of the reduced images; and
a third display controller configured to, in response to a change operation, change the reduced images displayed on the display to another reduced images without changing the tone-changed reduced image.

According to another embodiment, an image processing method comprises:

displaying, on a display, reduced images of original images;
converting, in response to an operation for specifying a displayed reduced image, a tone of a specified reduced image to a different tone;
displaying, on the display, a tone-changed reduced image in place of the specified reduced image; and
changing, in response to a change operation, the reduced images displayed on the display to another reduced images without changing the tone-changed reduced image.

According to another embodiment, an image processing apparatus configured to be connected to a server comprising a tone changer configured to change a tone of an image, the apparatus comprises:

a storage configured to store original images;
a display configured to display reduced images of the original images;
a specifying unit configured to specify one of the reduced images displayed on the display; and
a communication module configured to send an original image corresponding to the one of the reduced images specified by the specifying unit to the server,
wherein the original image sent to the server is supplied to the tone changer, and a tone-changed original image is send to the apparatus and is displayed at the display.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

FIG. 2 is a block diagram illustrating a configuration of the image processing apparatus according to the first embodiment.

DETAILED DESCRIPTION OF THE INVENTION

An embodiment of an image processing apparatus and an image processing method according to the present invention will now be described with reference to the accompanying drawings.

First Embodiment

Embodiments of the present invention will be hereinafter explained.

Figure 1A:
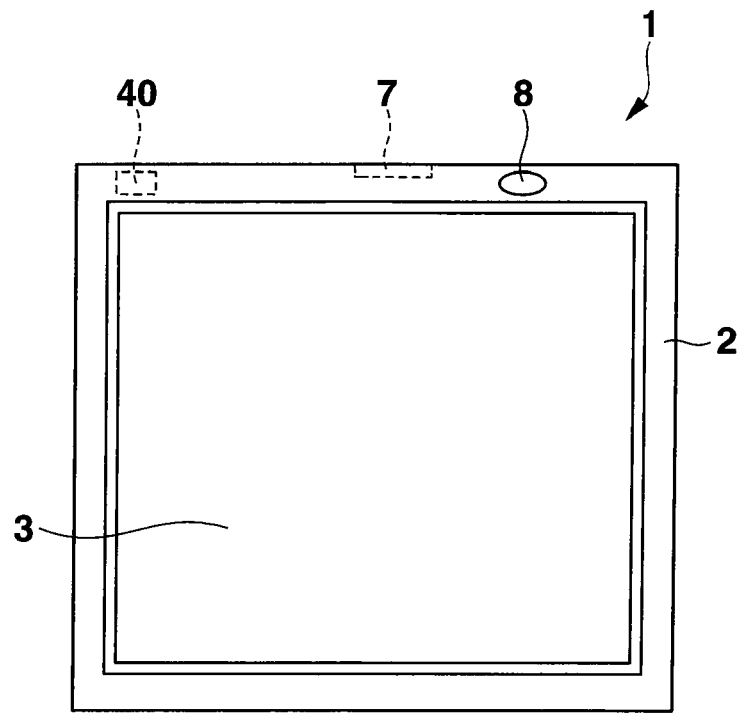
FIG. 1A is a front view illustrating an external appearance of an image processing apparatus according to the first embodiment of the invention.

FIG. 1A is an external view illustrating an image processing apparatus 1 according to the first embodiment of the present invention.

Figure 1B:
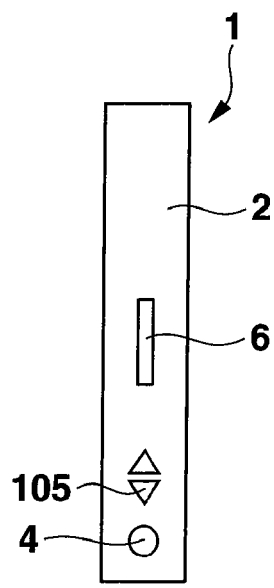
FIG. 1B is a side view illustrating an external appearance of the image processing apparatus according to the first embodiment.

A display device is provided on a front surface of the image processing apparatus 1. The display device includes a liquid crystal display panel 3 held on a thin plate style main body 2. A touch panel 5 is integrally formed on the liquid crystal display panel 3, so that a user can operate the touch panel 5 by touching it with a finger. An image capturing element 8A is provided at the right side of the upper portion of the front surface of the main body 2. A GPS (Global Positioning System) antenna 7 is provided at the center of the upper portion of the front surface of the main body. A sensor 40A is provided at the left side of the upper portion of the front surface of the main body. As shown in FIG. 1B, a memory card slot 6 is provided at a side surface.

FIG. 2 is a block diagram illustrating an electric configuration of the image processing apparatus 1 according to the present embodiment. The image processing apparatus 1 includes a CPU (Central Processing Unit) 11, a ROM (Read Only Memory) 12, a RAM (Random Access memory) 13, and an internal memory 14 which are connected to the CPU 11. The ROM 12 stores a program for causing the CPU 11 to perform operation as shown in the flowcharts as explained later. The CPU 11 includes a face recognition engine 100 for recognizing a face in an image captured by the capturing element 8A, a picture conversion engine 200 for changing a tone of an image in order to convert a digital picture image to an image of an artwork, such as water color painting, color pencil sketch, or pastel painting, and an environment information engine 400 for collecting and analyzing environmental information.

When a picture includes one or more faces, the face recognition engine 100 is capable of recognizing each face.

The picture conversion engine 200 performs picture conversion processing. As described above, the picture conversion is a technique for changing a tone of each piece of pixel data of an image to a tone of an artwork, such as Oil painting, Water color painting, and Pastel drawing in accordance with a predetermined algorithm and parameters (picture conversion parameters). The picture conversion processing performed by the picture conversion engine 200 includes processing for changing a tone of an image stored in a memory card 60, which is to be displayed, or an image provided by a content distribution site 530 to an artwork image and displaying the converted artwork image on the liquid crystal display panel 3 and processing for saving the artwork image to the internal memory 14 or the memory card 60.

It is possible to select a target artwork style obtained by converting a picture image to an artwork image, i.e., it is possible to select a feature (tone) of a converted image. In the present embodiment, examples of selectable artwork styles include 12 styles, i.e., Oil painting, Thick oil painting, Gothic oil painting, Fauvist oil paining, Water color painting, Gouache painting, Pastel painting, Color pencil sketch, Pointillism, Silkscreen, Drawing, and Air brush.

However, examples of selectable artwork styles are not limited to the above. In addition, it may be possible to allow selection of conversions incorporating features of artists such as Gogh style, Monet style, and Picasso style. Algorithms for other styles may be provided in the memory card 60. As a drawing touch, the thickness of a brush can be selected.

The environment information engine 400 obtains environmental information by collecting person proximity information (person detection information) provided by the sensor 40A, a temperature, a humidity, an atmospheric pressure, a wind velocity, and the like, and collecting position information such as a latitude, a longitude, and an altitude provided by a GPS controller 20 explained later, time information such as day/month/year, time, and season, image information provided by the image capturing element 8, weather forecast information provided by another site via the Internet 500, and the like.

The face recognition engine 100, the picture conversion engine 200, and the environment information engine 400 are made of an ASIC (Application Specific Integrated Circuit), a DSP (Digital Signal Processor), or a reconfigurable LSI (reconfigurable LSI that can be reconfigured by a program in C language and the like) working together with the CPU 11.

The RAM 13 is a work memory in which the CPU 11 temporarily stores various kinds of data as necessary.

The internal memory 14 is a large capacity non-volatile memory such as a hard disk drive or a flash memory. The internal memory 14 has folders formed therein and is configured to be able to store many images, which will be explained later in detail. In addition, the internal memory 14 includes a telephone book and a reaction log memory 300.

The display controller 16 drives the liquid crystal display panel 3 based on display image data provided by the CPU 11, so that images and various kinds of menus are displayed on the liquid crystal display panel 3. A key input controller 17 inputs an operation signal of the touch panel 5 based on the control of the CPU 11.

The touch panel 5 may employ, as necessary, one of various kinds of existing methods such as a capacitive method, an optical method, a resistive method, a surface acoustic wave method, an ultrasonic method, and an electromagnetic induction method. In addition, functions of a fingerprint authentication and a vein authentication can be incorporated into the touch panel 5.

A memory card interface 18 is an input/output interface for controlling input/output of data between the CPU 11 and various kinds of memory cards 60 detachably attached to the memory card slot 6.

An image capturing controller 19 drives the image capturing element 8A to control process for capturing an image of a subject. Image data captured as Bayer data are converted to YUV and RGB data. Thereafter, the data are compressed into JPEG (Joint Photographic Experts Group) data, and written into the internal memory 14 or the memory card 60.

The GPS controller 20 obtains position information based on information received by a GPS antenna 7. With the GPS controller 20, the current position of the image processing apparatus 1 can be obtained.

A power supply controller 70 obtains AC power supply via a power supply plug 81, converts the AC power supply to a direct current, and provides power of a main power supply 71 or a standby power supply 72 each unit.

The sensor 40A is a sensor for obtaining the environmental information. The sensor 40A includes a person detection sensor, a line sensor, a temperature sensor, a humidity sensor, an atmospheric pressure sensor, a wind velocity sensor, and an illumination sensor. The sensor 40A can obtain various kinds of environmental information by working together with the CPU 11, the face recognition engine 100, the environment information engine 400, and the image capturing element 8A.

For example, the sensor 40A detects a person in proximity. When there is no person in proximity for a predetermined time or more, the CPU 11 controls the power supply controller 70 to automatically turn off the main power supply 71 and cause only the standby power supply 72 to supply power, so that power is saved (auto power off). When the sensor 40A detects a person in proximity again, the main power supply 71 is turned on.

The sensor 40A can measure an angle of a viewer and a distance to the viewer. Further, the sensor 40A recognizes the face of a viewer, so that the power supply can be controlled in accordance with who is viewing pictures, and the sensor 40A can detect who is viewing pictures from what angle, and can detect whether the viewer viewing pictures is in proximity or at a distance.

The communication controller 30 connects to the Internet 500 via a telephone line 31 or a wireless LAN 32, and controls communication including transmission/reception of mails and transmission/reception of contents. An address book 33 is used for transmission/reception of mails. The address book 33 is actually arranged in the internal memory 14.

The reaction log memory 300 is arranged in the internal memory 14. The reaction log memory 300 stores a reaction log of a viewer (history) based on a result obtained by causing the image capturing element 8A to take a picture and causing face recognition engine 100 to recognize faces in the picture as described above, a reaction result of the sensor 40A, a touch result of the touch panel 5, and the like. A parameter memory 410 stores various kinds of parameter groups P for picture conversion.

Figure 3:
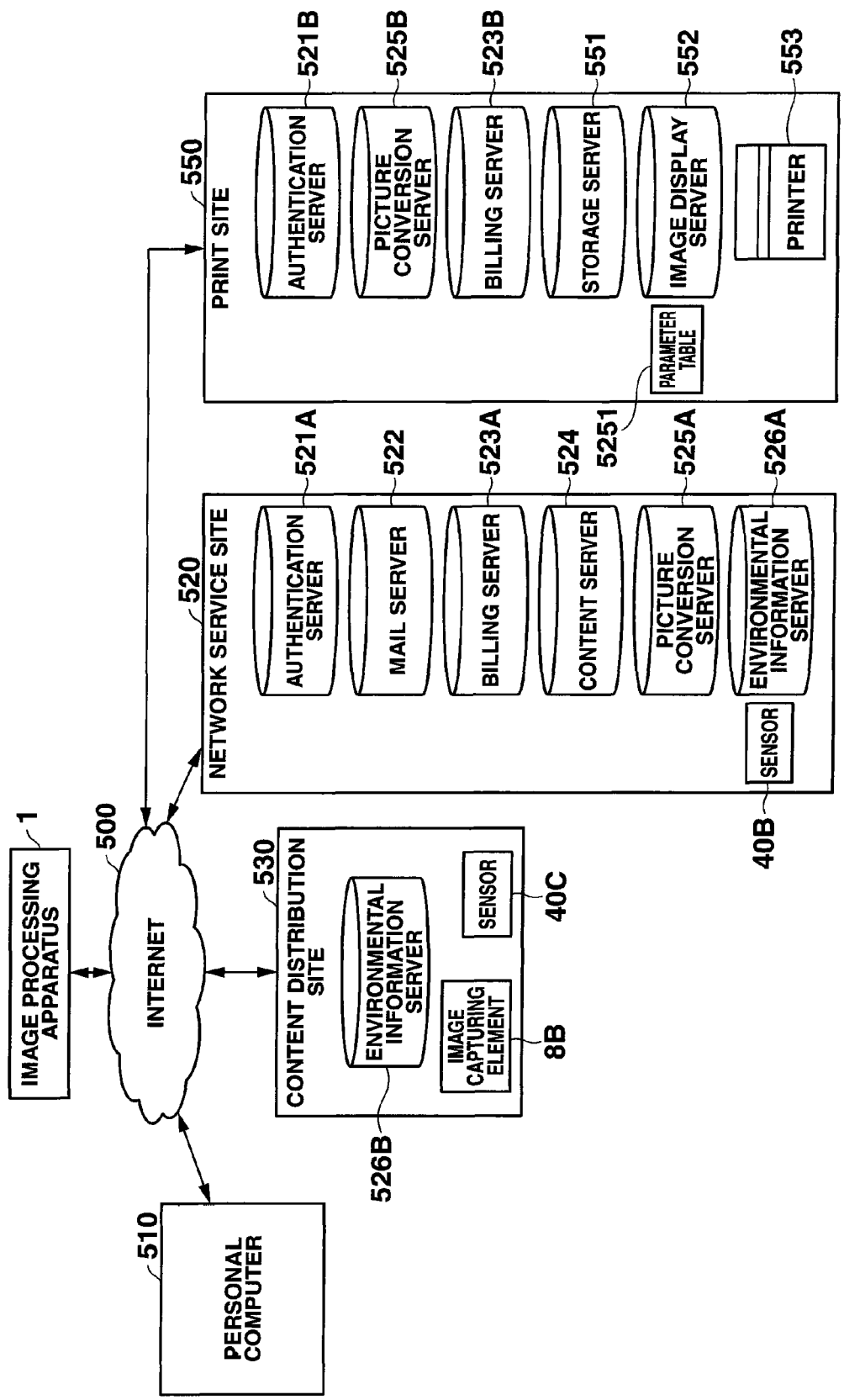
FIG. 3 is a block diagram illustrating a configuration of a network system including the image processing apparatus according to the first embodiment.

FIG. 3 is a schematic diagram illustrating configuration of a network system according to the present embodiment. The personal computer 510 can connect to the image processing apparatus 1 by way of the wireless LAN 32 and the like via the communication controller 30, and the personal computer 510 can configure complicated settings and the like that cannot be configured by the image processing apparatus 1.

A network service site 520 connected via the Internet 500 includes at least an authentication server 521A, a mail server 522, a billing server 523A, a content server 524, a picture conversion server 525A, and an environmental information server 526A. A sensor 40B is the same sensor as the sensor 40A of FIG. 2. The network service site 520 also serves as a network provider for the image processing apparatus 1.

The authentication server 521A authenticates a person who accesses the network service site 520. The mail server 522A manages transmission/reception of mails. The billing server 523A manages billing when images, music, programs, and other contents stored in the content server 524 are provided on a chargeable basis.

The picture conversion server 525A is provided so that the server also has the same function as the picture conversion engine 200 of FIG. 2. The environmental information server 526A is provided so that the server also has the same function as the environment information engine 400 of FIG. 2.

In addition, the content distribution site 530 is provided with an environmental information server 526B having the same function as the environment information engine 400 of FIG. 2. As a result, the image processing apparatus 1 can obtain environmental information of the content distribution provider in the distance. The environmental information server 526B is provided together with the sensor 40C. The sensor 40C is also the same sensor as the sensor 40A.

The content distribution site 530 for distributing various kinds of contents to be displayed on the image processing apparatus 1 includes many contents, and images, and can distribute data to the image processing apparatus 1 or the network service site 520 via the Internet 500.

An example of the content distribution site 530 is a live video content distribution site which has an image capturing element 8B to distribute a live video. The image capturing element 8B constantly captures a picture of mountains, sky, buildings, and the like, and the content distribution site 530 distributes a video or a still picture to the network service site 520.

A print site 550 changes a tone of image data received via a network such as the Internet 500. The print site 550 includes an authentication server 521B, a billing server 523B, and a picture conversion server 525B. The authentication server 521B, the billing server 523B, and the picture conversion server 525B are respectively the same as the authentication server 521A, the billing server 523A, and the picture conversion server 525A of the network service site 520. The received image data are temporarily stored in a storage server 551. A converted image converted by a picture conversion engine of the picture conversion server 525B is also temporarily stored in the storage server 551. A parameter table 5251 stores parameter (picture conversion parameter) groups for converting image data to various kinds of artworks such as Oil painting.

The converted image is printed onto paper, canvas, and other materials by using a printer 553 in the print site 550 or by placing an order with an agent specialized in printing.

The image display server 552 performs interface processing for a user when the image conversion processing is performed in the print site 550. In other words, the image display server 552 controls display for guiding a method for uploading a picture of a user himself/herself, a method for selecting an artwork style, a method for selecting a print size, a method for selecting a print material, and the like.

It should be noted that the above server configuration is merely an example. It may not be necessary to prepare a separate server for each processing.

Operation modes of the image processing apparatus 1 include an ordinary mode and an effect mode. A user can switch the operation mode by manipulating an operation switch 105 according to a predetermined procedure.

In the ordinary mode, images stored as image data in the memory card 60 are displayed on the liquid crystal display panel 3 as they are like a generally-available image processing apparatus. An example of an image that can be displayed on the image processing apparatus 1 is an image taken by a digital camera, which is compressed by JPEG (Joint Photographic Expert Group) method and stored as a still picture file together with additional information such as a capturing date/time. It is to be understood that the image processing apparatus 1 can also support various image formats such as RAW, BMP, and PNG. The image source may not be an image captured by a digital camera.

In the effect mode, an image to be displayed and stored in the memory card 60 is converted to an artwork image having a feature of a painting, i.e., an artwork image to which a particular effect is applied, and the converted artwork image is displayed on the liquid crystal display panel 3.

In the effect mode, it is possible to select a target picture style obtained by converting an image to an artwork image, i.e., it is possible to select a feature (tone) of a converted image. In the present embodiment, examples of selectable tones include Oil painting, Thick oil painting, Gothic oil painting, Fauvist oil paining, Water color painting, Gouache painting, Pastel painting, Color pencil sketch, Pointillism, Silkscreen, Drawing, and Air brush, as described above. However, examples of selectable tones are not limited to the above. In addition, it may be possible to allow selection of conversions incorporating features of artists such as Gogh style, Monet style, and Picasso style. Algorithms for other artwork styles may be provided in the memory card 60 later explained.

In the present embodiment, a program for conversion to 12 styles of artwork is stored. An order of conversion for selection is as follows: (1) Oil painting, (2) Thick oil painting, (3) Gothic oil painting, (4) Fauvist oil paining, (5) Water color painting, (6) Gouache painting, (7) Pastel painting, (8) Color pencil sketch, (9) Pointillism, (10) Silkscreen, (11) Drawing, and (2) Air brush.

Figure 4:
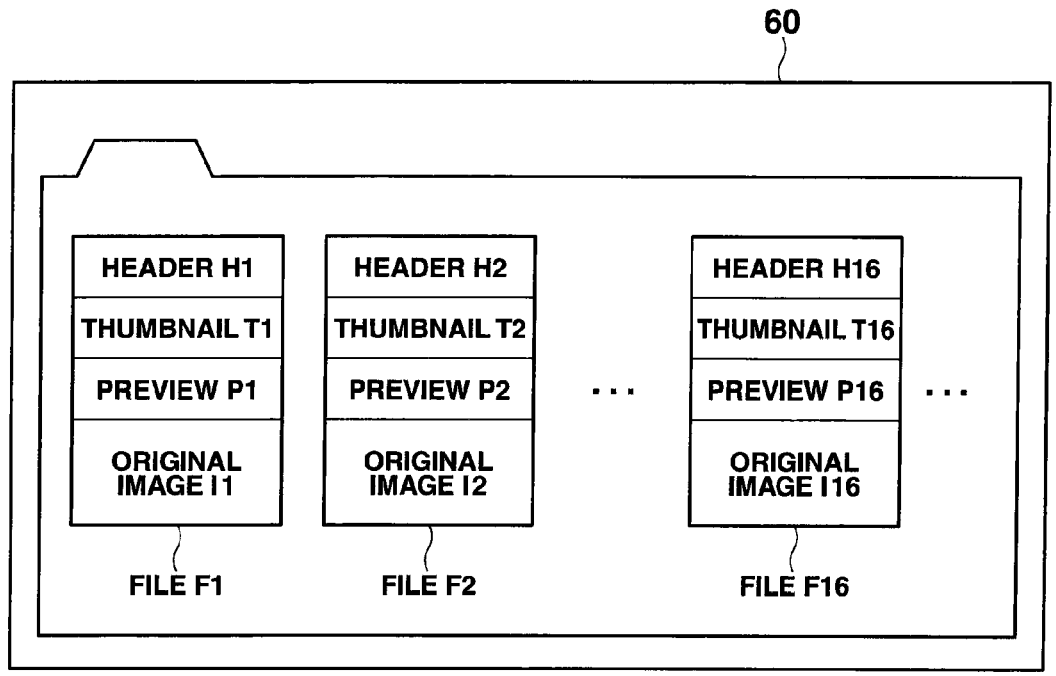
FIG. 4 is a transition diagram illustrating the state of storage in a memory card according to the first embodiment.
Figure 5:
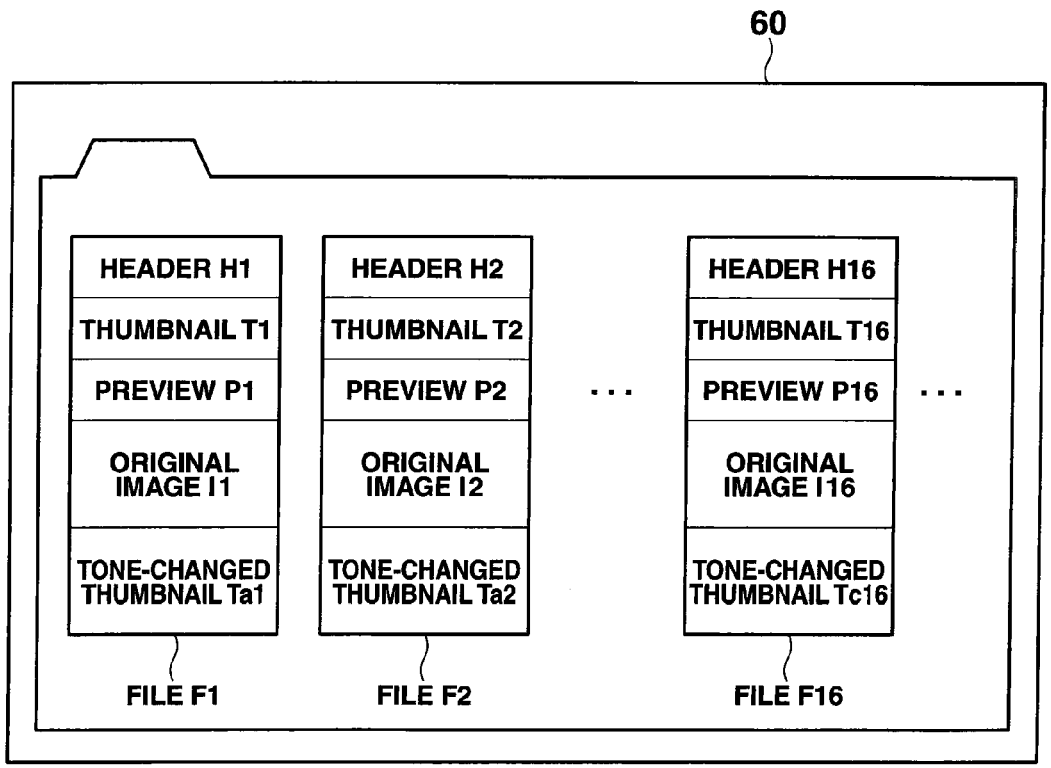
FIG. 5 is a transition diagram illustrating the state of storage in a memory card according to the first embodiment.
Figure 6:
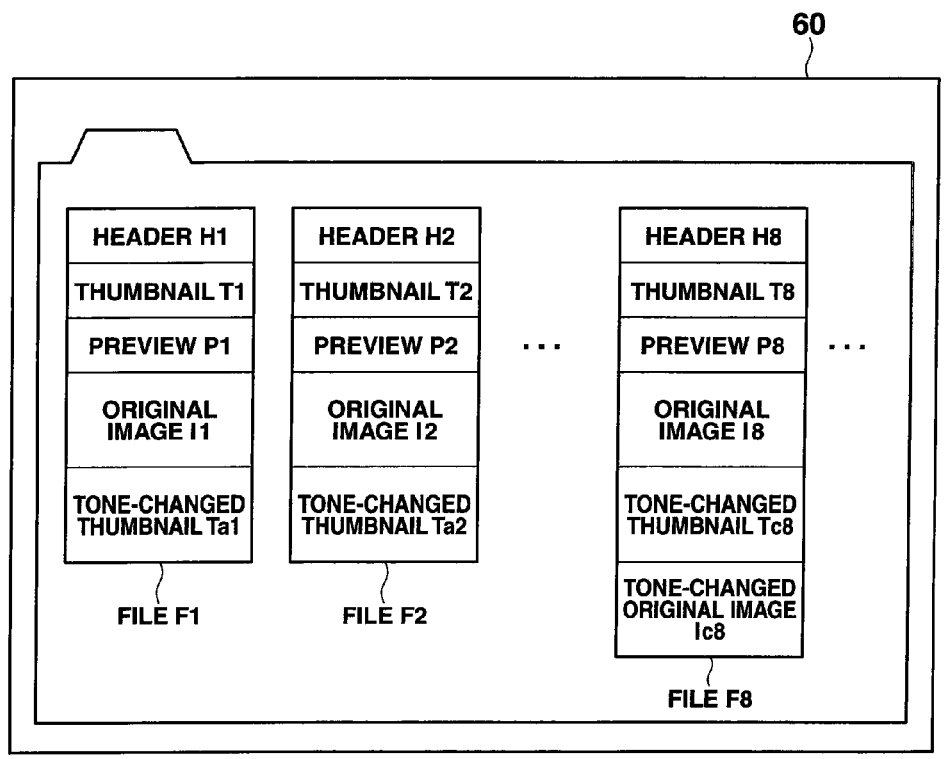
FIG. 6 is a transition diagram illustrating the state of storage in a memory card according to the first embodiment.

FIGS. 4-6 are memory configuration diagrams illustrating the content of recordings in the memory card 60. The memory card 60 is detachably attached to the digital camera. Every time a picture is taken with a digital camera, the image data is converted to a file having JPEG file format. Accordingly, a plurality of files F1, F2, F3, . . . are recorded in the memory card 60. The files F1, F2, F3, . . . include a header H1, H2, H3, . . . including data such as EXIF (Exchangeable Image File Format), image data of captured images (images in original size (which may be hereinafter also referred to as original images I1, I2, I3, . . . )), image data of thumbnails obtained by reducing the image data (thumbnails T1, T2, T3, . . . ), and preview image data (previews P1, P2, P3, . . . ). Since the size of a reduced image displayed on a screen is different according to the size of the display screen, preview images for display (previews P1, P2, P3, . . . ) may be generated and stored separately from the thumbnails described above. In the present embodiment, thumbnails as well as preview images are collectively referred to as thumbnails. The preview image has the same number of pixels as the number of pixels of the liquid crystal display panel 3. A plurality of folders may be generated in the memory card 60, so that data may be written into a particular folder according to a type of data. Hereinafter, in the first embodiment, it is assumed that files are saved in the first folder.

The image files F1, F2, F3, . . . have a file format used in a generally-available digital camera. Therefore, the images files F1, F2, F3, . . . can be used by simply plugging the SD card (memory card 60) including pictures taken by the digital camera into the memory card slot 6.

A specific operation of the image processing apparatus 1 in the effect mode will be hereinafter explained.

Figure 7:
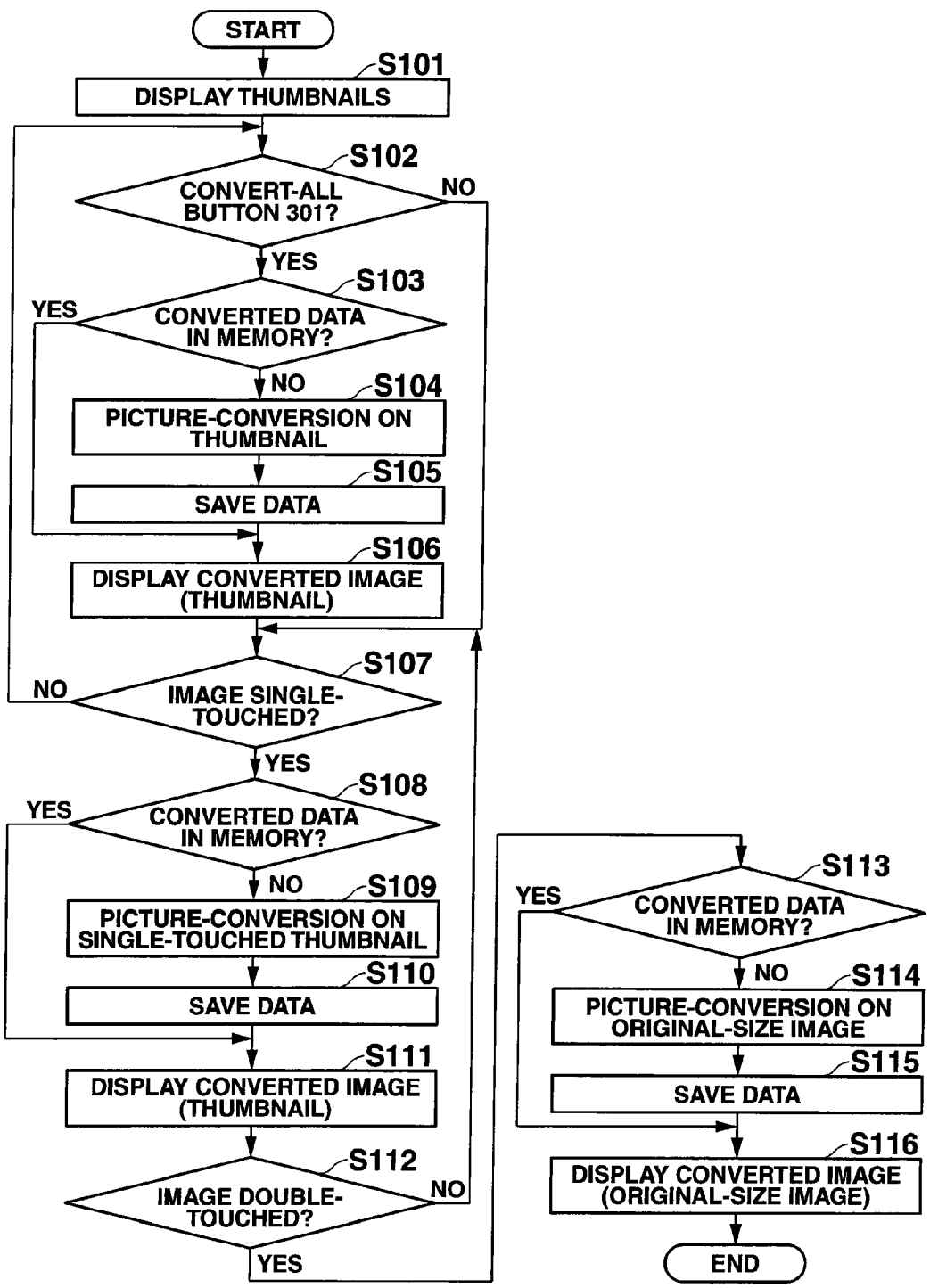
FIG. 7 is a flowchart illustrating a picture-conversion performed by the image processing apparatus according to the first embodiment.

FIG. 7 is a flowchart illustrating a main routine in a picture-conversion performed by the CPU 11 set in the effect mode according to the first embodiment. In the effect mode, the CPU 11 executes processing as shown in this flowchart in accordance with the program stored in the ROM 12.

Figure 8:
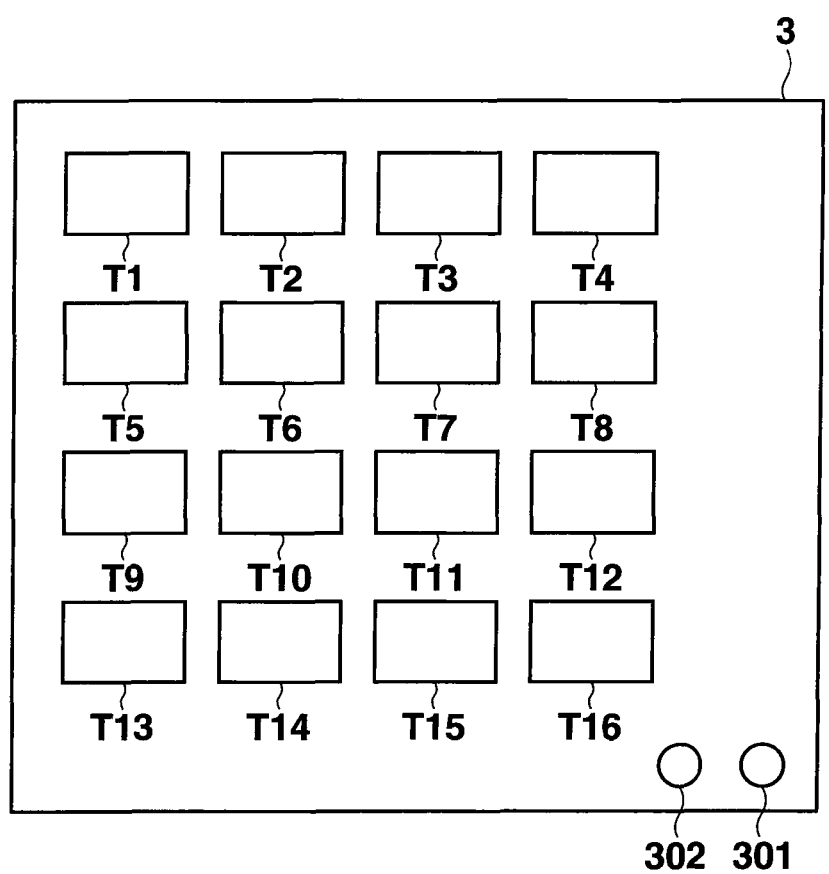
FIG. 8 is a display transition diagram of a liquid crystal display panel according to the first embodiment.

The CPU 11 reads, from the memory card 60, thumbnail image data in image files F1 to F16 to be displayed. Then, based on these thumbnail image data, thumbnails are displayed on the liquid crystal display panel 3 (step S101). Therefore, as a result of the processing in step S101, the original thumbnails T1 to T16 are displayed as a list on the liquid crystal display panel 3 as shown in FIG. 8. In the following explanation, the original thumbnails may be simply referred to as thumbnails for the sake of convenience. The CPU 11 also displays a convert-ALL button 301 and a next page button 302 at a corner of a lower end of the liquid crystal display panel 3.

FIG. 8 illustrates an example of display on the liquid crystal display panel 3. In FIG. 8, sixteen original thumbnails T1-T16 are displayed in one screen. As shown in FIGS. 4 to 6, preview images having the same number of pixels as the number of pixels of the liquid crystal display panel 3 are prepared.

Although the numbers of pixels of taken images I1, I2, I3, . . . rely on a digital camera and the like with which the images are taken, examples of the number of pixels include XGA(1024×768), SXGA(1280×1024), UXGA(1600×1200), and QXGA(2048×1536) . . . . A digital camera having 12 million pixels or more produces an image having 4000×3000 pixels or more. For example, it is assumed that the liquid crystal display panel 3 can display an image having 800×600 pixels. In this case, the preview image has 800×600 pixels. Each of the thumbnails T1, T2, T3, . . . has 160×120 pixels. Each of the thumbnails T1, T2, T3, . . . may be prepared in files F1, F2, F3, . . . in advance, or may be reduced when it is displayed. In full-screen display, the preview image is displayed as it is since the image display region of the liquid crystal display panel 3 is 800×600 pixels.

When a user manipulates the next page button 302, sixteen different original thumbnails are read from the memory card 60, and thumbnails displayed on the liquid crystal display panel 3 can be changed. Alternatively, a page may be turned without arranging the button, and the page may be turned by sliding a finger on the screen. It should be noted that the thumbnails may not be turned in units of pages. The thumbnails may be scrolled in units of lines or columns, or may be scrolled seamlessly little by little.

In the convert-ALL button 301 and the next page button 302 displayed at the corner of the lower end of the liquid crystal display panel 3, it is determined whether a user touches the convert-ALL button 301 within a certain period of time after the thumbnails are displayed based on output from the touch panel 5 (step S102).

When the convert-ALL button 301 is determined not to be touched, step S107 is performed after step S102. It is determined whether any one of the thumbnails is single-touched. When none of them is single-touched, processing of step S102 and subsequent steps are repeated.

When a user single-touches one of the thumbnails while thumbnails T1 to T16 are displayed on the liquid crystal display panel 3, the touch panel 5 detects the thumbnail touched by the user, and the CPU 11 determines that the result is YES in step S107. Then, the CPU 11 subsequently performs step S108, in which it is determined whether the memory card 60 already has picture-converted data.

Figure 9A:
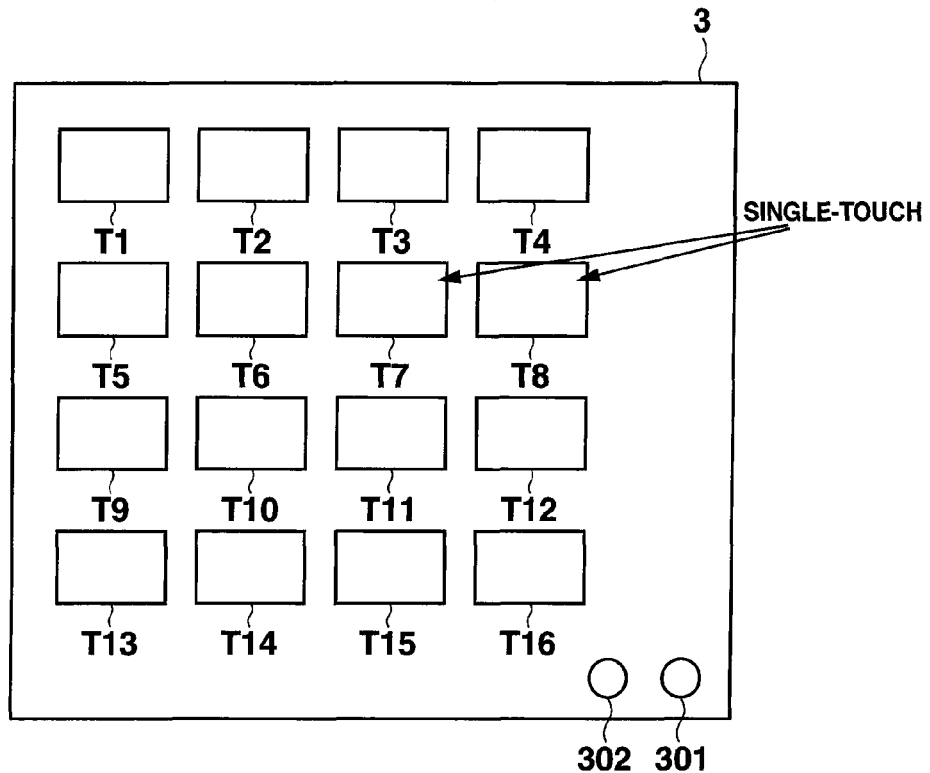
FIG. 9A is a display transition diagram of the liquid crystal display panel subsequent to FIG. 8.

In step S109 subsequent to step S108, the picture conversion processing is executed on the single-touched thumbnail. For example, as shown in FIG. 9A, it is assumed that a user single-touches the thumbnail T7 and the thumbnail T8 while the thumbnails T1 to T16 are displayed (the same state as that of FIG. 8). In this case, since the oil painting is "1" in the order of conversion, the thumbnail T7 and the thumbnail T8 are subjected to the picture conversion processing to be converted to the oil painting.

Image data of the thumbnail T7 and the thumbnail T8 converted to oil painting may be already stored in the memory card 60 as explained later. Therefore, in step S108, it is determined whether the memory card 60 has image data obtained by converting the thumbnails to the oil painting. Only when the memory card 60 is determined not to have the image data, the picture conversion (to oil painting) processing is executed on the single-touched thumbnails (step S109).

In the picture conversion processing, the CPU 11 reads an oil painting conversion parameter having the highest order of conversion from among picture conversion parameters stored in the parameter memory 410, and performs the picture conversion processing on the thumbnail T7 and the thumbnail T8 in accordance with the picture-conversion algorithm for Oil-painting stored in the ROM 12, thus generating picture-converted image data. On the basis of the picture-converted image data thus generated, a picture-converted image of the oil painting is generated. The image data of the thumbnail converted to the oil painting thus generated in the processing of step S109 is written into a corresponding file in the memory card 60 (step S110).

Figure 9B:
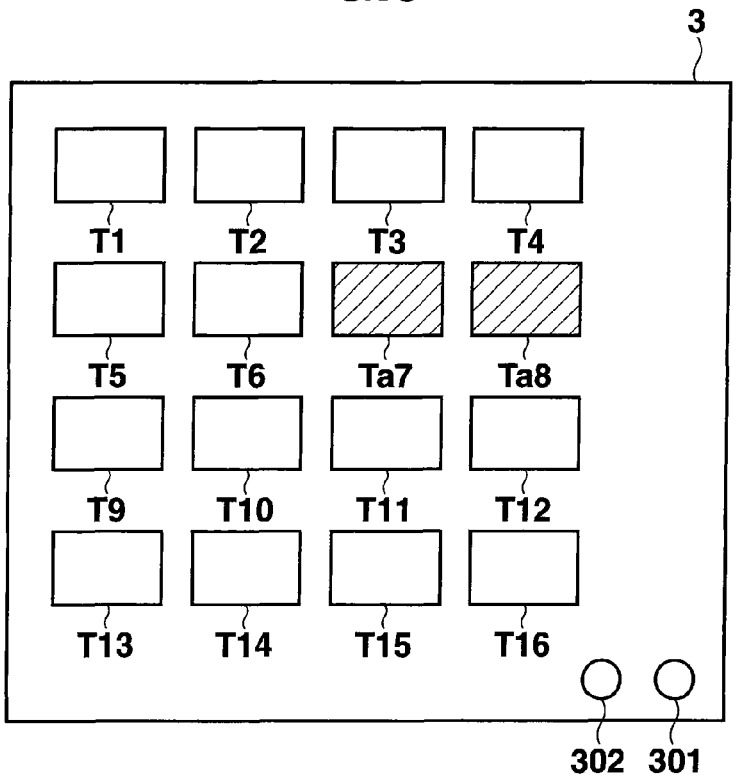
FIG. 9B is a display transition diagram of the liquid crystal display panel subsequent to FIG. 9A.

Thereafter, the converted picture thumbnails of the oil painting style Ta7 and Ta8 are displayed in place of the non-converted thumbnail T7 and the non-converted thumbnail T8 currently displayed on the liquid crystal display panel 3 (step S111). Therefore, as a result of the processing in step S111, the display screen of the liquid crystal display panel 3 changes from the state as shown in FIG. 9A to the state as shown in FIG. 9B, so that the thumbnails Ta7 and Ta8 of the oil painting style are displayed on the liquid crystal display panel 3 in place of the non-converted thumbnails T7 and T8.

Figure 10A:
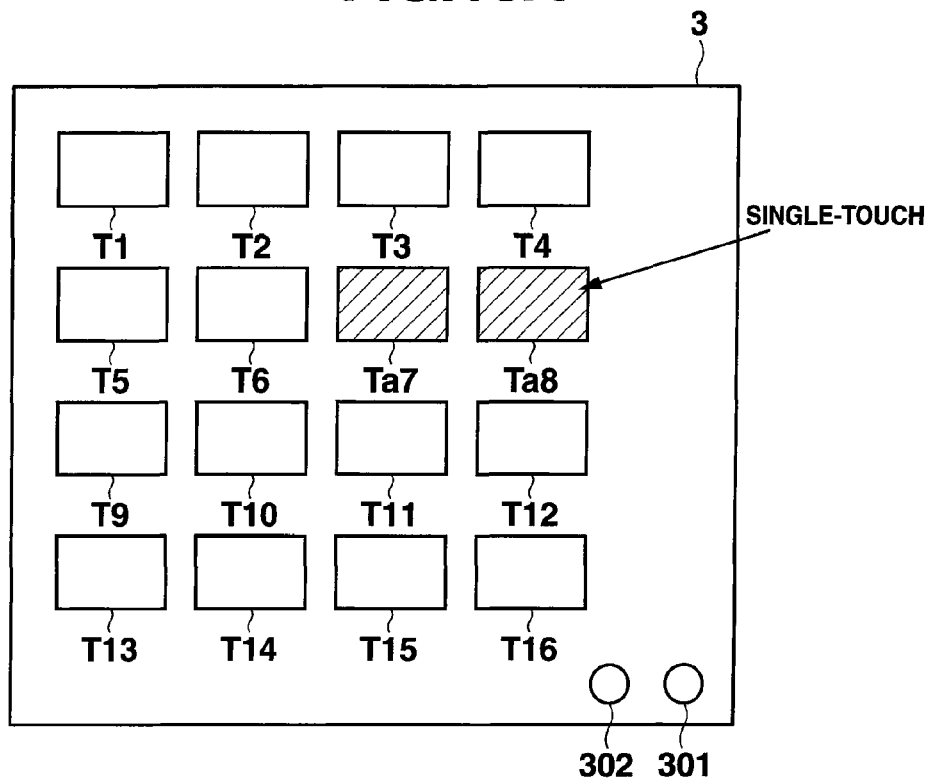
FIG. 10A is a display transition diagram of the liquid crystal display panel subsequent to FIG. 9B.

Subsequently, it is determined whether any one of the thumbnails is double-touched (touched twice successively) (step S112). When none of them is double-touched, step S107 is subsequently performed. When a user single-touches the thumbnail Ta8 of the oil painting style in the display state as shown in FIG. 10A (the same display state as that of FIG. 9B), the thumbnail Ta8 of the oil painting style is subjected to the picture conversion processing to be converted to thick oil painting since the order of conversion subsequent to (1) Oil painting is (2) Thick oil painting.

Image data of the thumbnail T8 converted to a thick oil painting may be already stored in the memory card 60. Therefore, in step S108, it is determined whether the memory card 60 has image data obtained by converting the thumbnail T8 to a thick oil painting. Only when the memory card 60 is determined not to have the image data, another picture style (thick oil painting) conversion processing is executed on the single-touched thumbnail Ta8 of the oil painting style (step S109).

The image data of the picture-converted thumbnail thus generated in the processing of step S109 is written into a corresponding file in the memory card 60 (step S110).

Figure 10B:
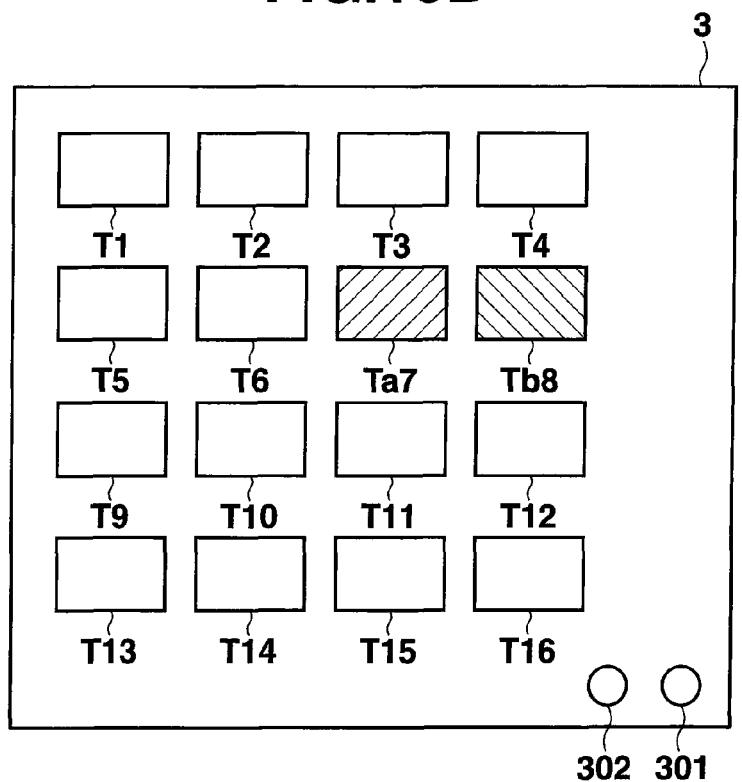
FIG. 10B is a display transition diagram of the liquid crystal display panel subsequent to FIG. 10A.

Thereafter, the picture-converted thumbnail Tb8 of the thick oil painting style is displayed in place of the thumbnail Ta8 of the oil painting style currently displayed on the liquid crystal display panel 3 (step S111). Therefore, as a result of the processing in step S111, the display screen of the liquid crystal display panel 3 changes from the state as shown in FIG. 10A to the state as shown in FIG. 10B, so that the thumbnail Tb8 of the thick oil painting style is displayed on the liquid crystal display panel 3 in place of the thumbnail Ta8 of the oil painting style.

Therefore, every time a desired thumbnail is touched, the picture style of the thumbnail changes in order in accordance with the predetermined priority as follows: (1) Oil painting, (2) Thick oil painting, (3) Gothic oil painting, (4) Fauvist oil paining, (5) Water color painting, (6) Gouache painting, (7) Pastel painting, (8) Color pencil sketch, (9) Pointillism, (10) Silkscreen, (11) Drawing, and (12) Air brush, Therefore, the user can see the image converted to a desired artwork style in a short time, and furthermore the user can easily select which image is converted to which artwork style.

Figure 11A:
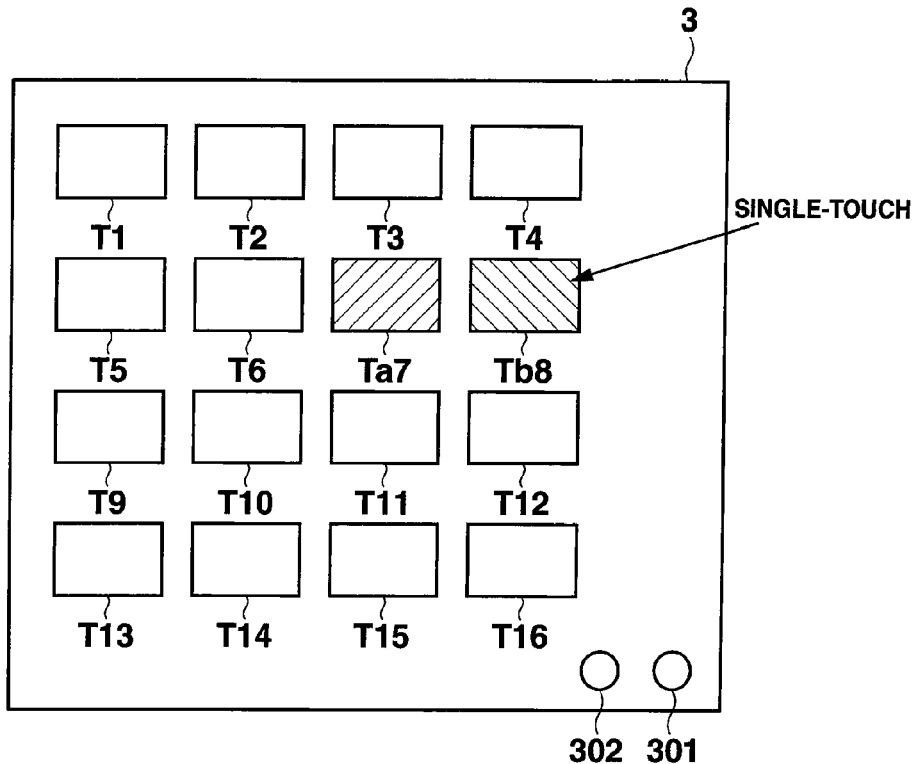
FIG. 11A is a display transition diagram of the liquid crystal display panel subsequent to FIG. 10B.

Subsequently, it is determined whether any one of the thumbnails is double-touched (touched twice successively) (step S112). When none of them is double-touched, step S107 is subsequently performed. It is assumed that a user single-touches the thumbnail Tb8 of the thick oil painting style in the display state as shown in FIG. 11A (the same display state as that of FIG. 10B). The thumbnail Tb8 of the thick oil painting style is subjected to the picture conversion processing to be converted to gothic oil painting style since the priority of conversion subsequent to (2) Thick oil painting is (3) Gothic oil painting (step S109).

Figure 11B:
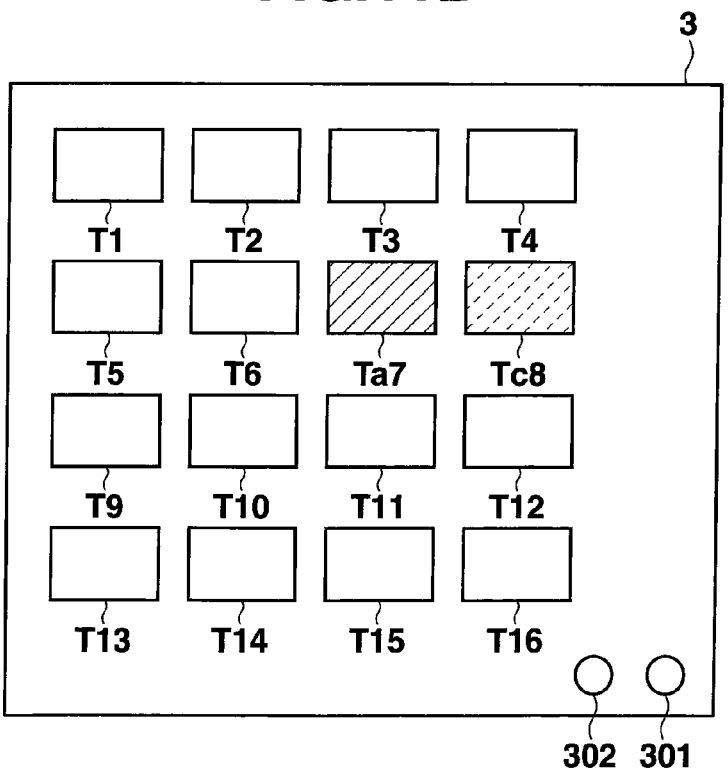
FIG. 11B is a display transition diagram of the liquid crystal display panel subsequent to FIG. 11A.

After the converted data are saved (step S110), the picture-converted thumbnail Tc8 of the gothic oil painting style thus generated is displayed in place of the thumbnail Tb8 of the thick oil painting style currently displayed on the liquid crystal display panel 3 (step S111). Therefore, as a result of the processing in step S111, the display screen of the liquid crystal display panel 3 changes from the state as shown in FIG. 11A to the state as shown in FIG. 11B, so that the thumbnail Tc8 of the gothic oil painting style is displayed on the liquid crystal display panel 3 in place of the thumbnail Tb8 of the thick oil painting style.

As described above, the CPU 11 converts the artwork style of the thumbnail whose data size is much smaller than the size of the original image instead of converting the original image. Therefore, it takes only a short time to perform the picture conversion processing. Therefore, the user can see the picture-converted images (Oil painting thumbnail Ta7, Thick oil painting thumbnail Tb8, Gothic oil painting thumbnail Tc8) in a short time.

With a single touch operation, the user can easily select which image is converted to which artwork style. Therefore, the user can instantly try various conversions to determine which artwork style is suitable for an original image corresponding to a thumbnail.

When the user double-touches any one of the images while images of at least two picture styles are displayed as described above, the touch panel 5 detects the thumbnail touched by the user, and the CPU 11 determines that the result is YES in step S112. Then, the CPU 11 subsequently performs step S113 after step S112, and it is determined whether the memory card 60 already has original image data converted to the double-touched picture style.

When the memory card 60 is determined not to have the picture-converted original image data in step S113, the picture conversion processing of the touched artwork style is executed on the original image corresponding to the double-touched thumbnail in step S114.

The picture conversion processing for the touched picture style is executed on the original image corresponding to the double-touched thumbnail of the picture image (step S114).

Figure 12A:
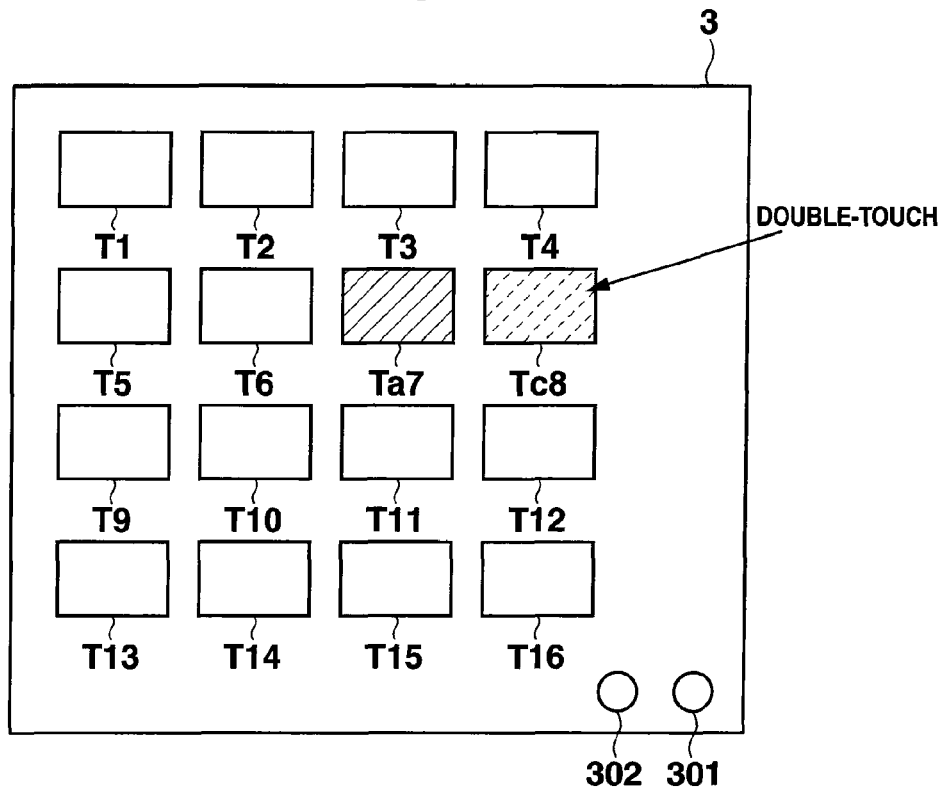
FIG. 12A is a display transition diagram of the liquid crystal display panel subsequent to FIG. 11B.

For example, as shown in FIG. 12A, when a user double-touches the gothic oil painting thumbnail Tc8 while the original thumbnails T1 to T6 and T9 to T16, the oil painting thumbnail Ta7, and the gothic oil painting thumbnail Tc8 are displayed (the same display state as FIG. 11B), the CPU 11 searches a file F8 including the gothic oil painting thumbnail Tc8 from the memory card 60, and reads an original image I8 from the found file F8 (see FIG. 5). In this case, the picture style to which the is to be converted is the gothic oil painting style since the gothic oil painting thumbnail Tc8 is double-touched. Accordingly, the picture conversion processing is performed on original image I8 so that it is converted to a gothic oil painting.

Subsequently, the image data Ic8 of the original size converted to a gothic oil painting thus generated in the processing of step S114 is written into a corresponding file F8 in the memory card 60 (step S115). Therefore, in the processing of step S114, the picture-converted original size image Ic8 obtained by converting the original image to the gothic oil painting is attached to the file F8 and saved as shown in FIG. 6. As a result, it is possible to prevent execution of redundant processing for generating the same picture-converted original size image again in an interrupt routine later explained.

In reality, the original size image has a size of 4000×3000 pixels. Therefore, when a preview is displayed, the original size picture-converted image is reduced to a size of 800×600 pixels and is displayed. Alternatively, a preview image having a size of 800×600 pixels is simultaneously picture-converted and is displayed. No matter whether the former or the latter is displayed, they appear to be the same on the display screen. However, in order to obtain a picture converted image saved in the internal memory 14 or the memory card 60, it is necessary to actually perform the picture conversion processing on an original size image having 4000×3000 pixels.

Figure 12B:
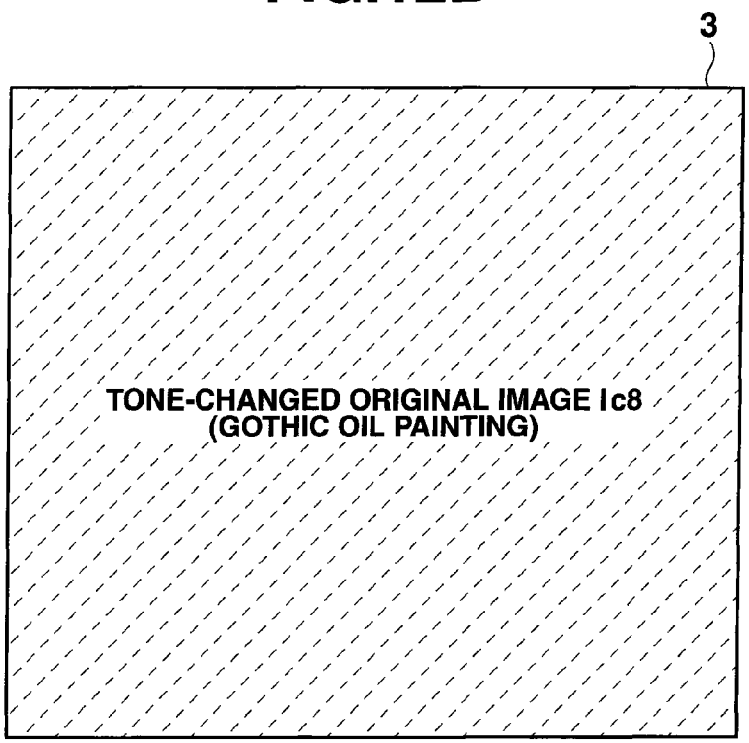
FIG. 12B is a display transition diagram of the liquid crystal display panel subsequent to FIG. 12A.

An image Ic8 generated by converting the original image I8 to a pastel drawing is displayed in full screen in place of the original thumbnails T1 to T6 and T9 to T16, the oil painting thumbnail Ta7, and the gothic oil painting thumbnail Tc8 which are currently displayed on the liquid crystal display panel 3 (step S116). Therefore, as a result of the processing in step S116, the display screen of the liquid crystal display panel 3 changes from the state as shown in FIG. 12A to the state as shown in FIG. 12B, so that the original size image Ic8 of the gothic oil painting style is displayed on the liquid crystal display panel 3.

Therefore, with a single touch operation on the display screen, the user can easily select which image is converted to which artwork style, and furthermore the user can instantly try various picture-conversions and convert the original image to an artwork that the user thinks is suitable at last.

On the other hand, the convert-ALL button 301 is determined to be touched in step S102, step S103 is performed after step S102, and it is determined whether the memory card 60 already has data explained below.

More specifically, in step S104 subsequent to step S103, the picture conversion processing is performed on all the thumbnails currently displayed on the liquid crystal display panel 3 at a time in accordance with the priority of conversion. In the present embodiment, a program is written into convert images to 12 styles of artwork from (1) Oil painting to (12) Air brush painting in accordance with the above described priority. Therefore, in response to the first operation of the convert-ALL button 301, the image conversion processing for "(1) Oil painting" is performed.

Image data of some of the thumbnails converted to the oil painting may be already stored in the memory card 60. Therefore, in step S103, it is determined whether the memory card 60 has thumbnail image data obtained by converting the thumbnails to the oil painting. The picture conversion processing is performed only on the thumbnails whose image data converted to the oil painting are not stored in the memory card 60 so that these thumbnails are converted to the oil painting (step S104).

The image data of the thumbnail converted to an artwork thus generated in the processing of step S104 is written into a corresponding file in the memory card 60 (step S105). Therefore, in the processing of step S105, the thumbnails converted to an artwork are attached to the files F1 to F16 and saved as shown in FIG. 5. As a result, it is possible to prevent execution of redundant processing for generating the same thumbnail converted to an artwork again in the interrupt routine later explained.

Figure 13A:
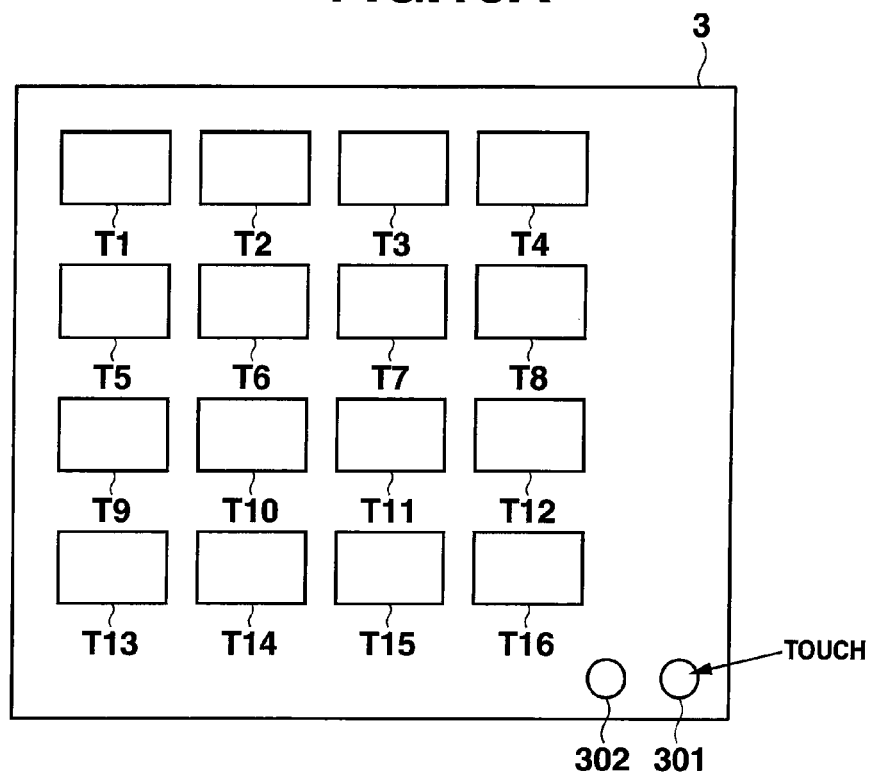
FIG. 13A is a display transition diagram of the liquid crystal display panel subsequent to FIG. 12B.
Figure 13B:
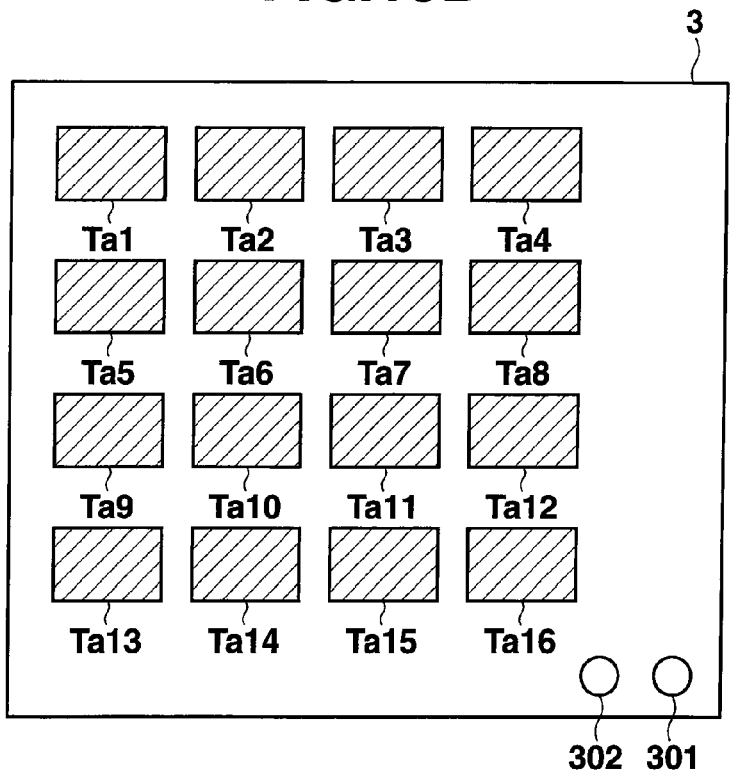
FIG. 13B is a display transition diagram of the liquid crystal display panel subsequent to FIG. 13A.

The picture-converted thumbnails Ta1 to Ta16 of the oil painting style are displayed in place of the thumbnails T1 to T16 currently displayed on the liquid crystal display panel 3 (step S106). Therefore, as a result of the processing in step S106, the display screen of the liquid crystal display panel 3 changes from the state as shown in FIG. 13A to the state as shown in FIG. 13B, so that the thumbnails T1 to T16 converted to the oil painting are displayed on the liquid crystal display panel 3. Therefore, the user can see the thumbnail Ta1 to Ta16 converted to the oil painting in a short time.

When the convert-ALL button 301 is determined not to be touched, step S107 is performed after step S102. It is determined whether any one of the thumbnails is single-touched. When none of them is single-touched, processing of step S102 and subsequent steps are repeated. Therefore, when the user touches the convert-ALL button 301 again in the display state as shown in FIG. 14A (the same display state as that of FIG. 13B), the image conversion processing for "(2) Thick oil painting" is performed in response to the second operation of the convert-ALL button 301 (step S104).

Figure 14A:
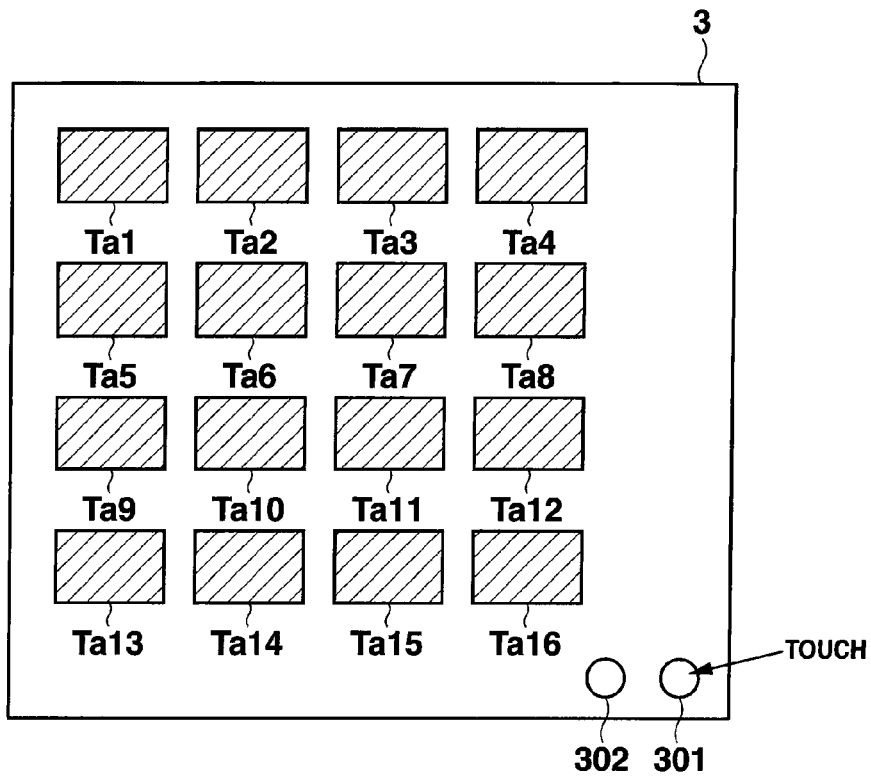
FIG. 14A is a display transition diagram of the liquid crystal display panel subsequent to FIG. 13B.
Figure 14B:
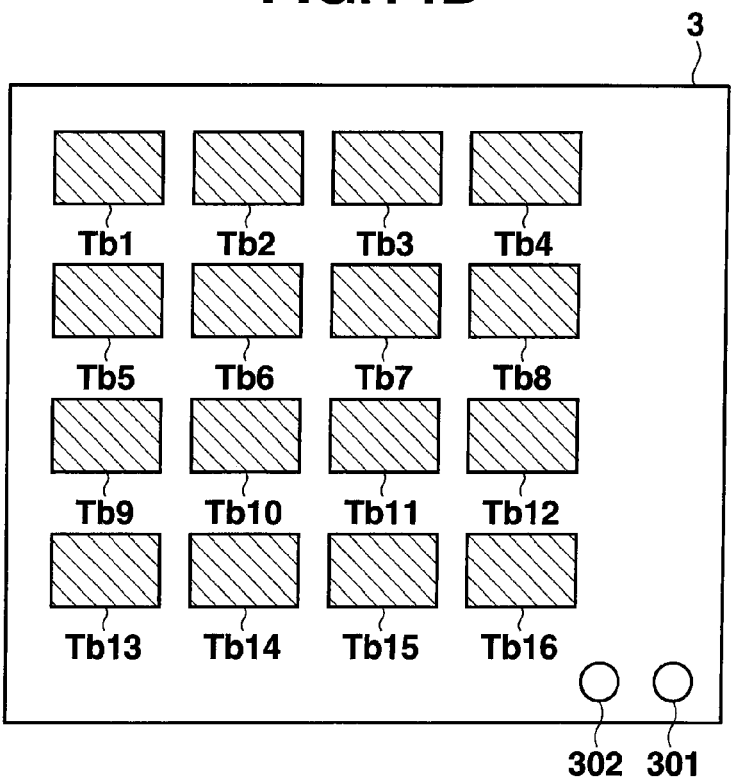
FIG. 14B is a display transition diagram of the liquid crystal display panel subsequent to FIG. 14A.

Therefore, as a result of the processing in step S106, the display screen of the liquid crystal display panel 3 changes from the state as shown in FIG. 14A to the state as shown in FIG. 14B, so that the thumbnails T1 to T16 converted to the thick oil painting are displayed on the liquid crystal display panel 3. Therefore, the user can see the thumbnail images Tb1 to Tb16 converted to the water color painting in a short time.

In some cases, displayed thumbnails may be of different artwork styles. For example, in FIG. 13A, when a user operates the convert-ALL button 301 while the oil painting thumbnail Ta7 is displayed and the gothic oil painting thumbnail Tc8 is displayed as shown in FIG. 12A, the thumbnails T1 to T6 and T9 to T16 are converted to the oil painting in accordance with the priority of conversion of the picture conversions as described above. At the same time, the oil painting thumbnail Ta7 is converted to the thick oil painting style, and the gothic oil painting thumbnail Tc8 is converted to the fauvist oil painting style. However, the present embodiment is not limited thereto. Alternatively, all the thumbnails T1 to T16 may be converted to the oil painting style.

Figure 15:
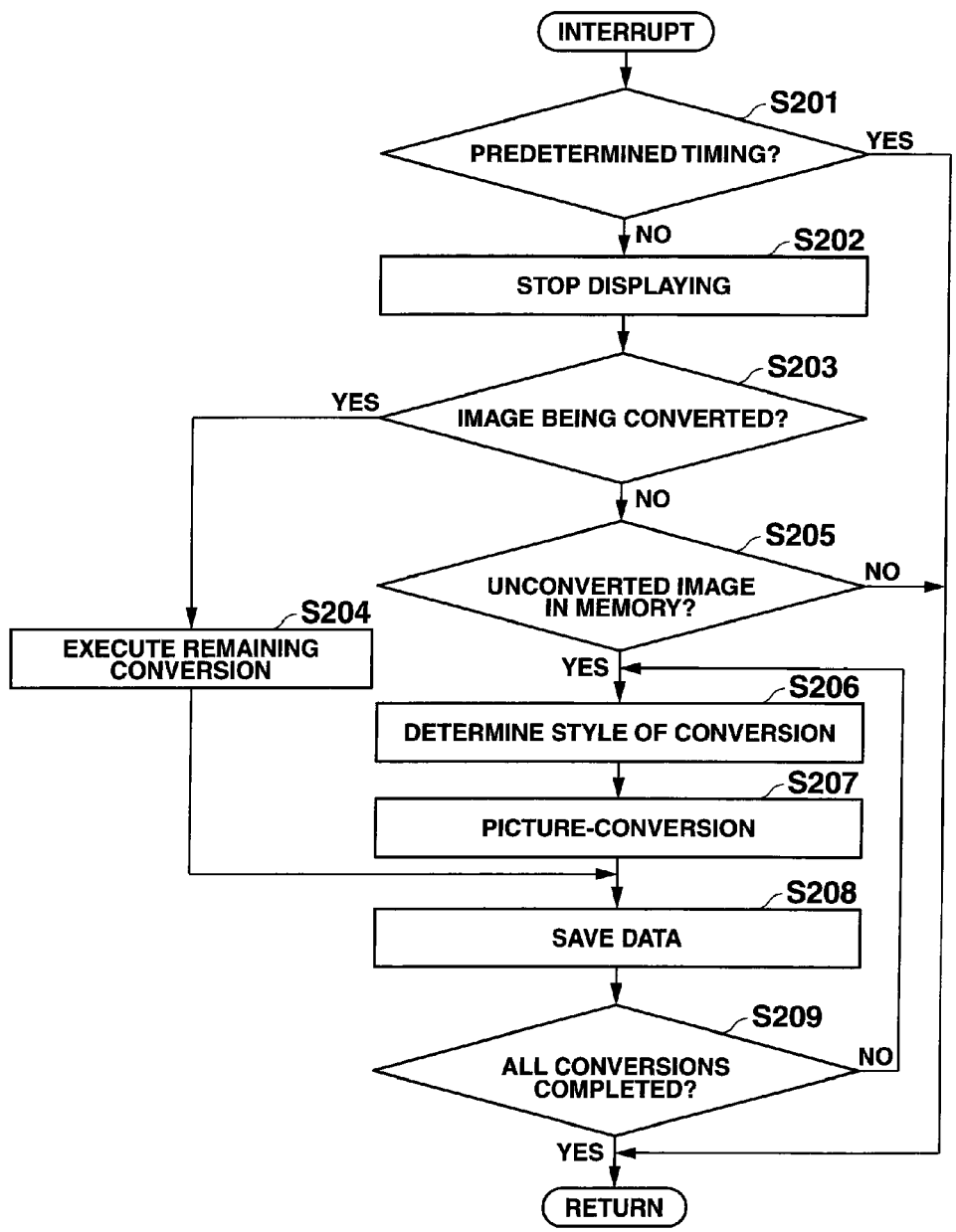
FIG. 15 is a flowchart illustrating a procedure of interrupt processing according to the first embodiment.

On the other hand, the CPU 11 interrupts the main routine with a constant interval of time, and executes the interrupt processing in accordance with the flowchart as shown in FIG. 15. In other words, the CPU 11 determines whether it is a predetermined timing or not (step S201). In this case, examples of determination as to whether it is a predetermined timing or not include as followings: 1) the CPU 11 determines whether it is a predetermined time based on a time measured by a clock, e.g., whether it is between 2 o'clock and 3 o'clock midnight, 2) the CPU 11 determines whether it is a timing when there is no person around the image processing apparatus 1 for a predetermined time or more based on a signal output from the sensor 40, and 3) the CPU 11 determines whether it is a timing when the power supply is turned off.

When it is not determined to be the predetermined timing, the CPU 11 returns back to the main routine without executing the subsequent processing. On the other hand, when it is determined to be the predetermined timing, the CPU 11 stops displaying the image data on the liquid crystal display panel 3 (step S202), and then, determines whether there is any image being in the process of conversion (step S203). When it is determined that there is an image being in the process of conversion, the CPU 11 reads stored image data being in the process of conversion and data indicating the progress of conversion from RAM 13, and executes the remaining conversion (step S204). Therefore, the CPU 11 stops displaying the image data on the is apparatus step S202, so that the load of the CPU 11 is reduced, and the following conversion processing can be completed in a short time.

When it is determined that there is no image being in the process of conversion in step S203, it is determined whether the memory card 60 includes any image data that have not yet converted (step S205). This determination is made based on whether there is no thumbnail image converted to an artwork as shown in FIG. 5 or based on whether there is no original size image converted to an artwork as shown in FIG. 6. When it is determined that there is no unconverted image data, the CPU 11 returns back to the main routine. On the other hand, when it is determined that there is unconverted image data (original image and thumbnail) in step S205, a style of conversion is determined in accordance with the order of conversion from (1) Oil painting to (12) Air brush, and a conversion program is executed using a parameter corresponding to the determined conversion. Then, the picture conversion is performed on the image data (steps S206 and S207).

The picture conversions to (1) Oil painting to (12) Air brush are successively performed on the thumbnails T1 to T16 of the files F1 to F16, and picture conversions to (1) Oil painting to (12) Air brush are successively performed on the original images I1 to I16 of the files F1 to F16. Thereafter, the image data of the picture-converted images thus generated in the processing of step S204 or step S207 is written into corresponding files F1 to F16 (step S208).

Subsequently, it is determined whether conversions of all the styles have been completed or not (step S209). Then, when the conversions of all the styles are determined not to have been completed, the CPU 11 returns back to step S206, so that a subsequent conversion style is determined, and the conversion is executed. When the conversions of all the styles are determined to have been completed in step S209, the automatic conversion processing is terminated.

As described above, the interrupt processing is performed, so that when a user inputs a conversion instruction to see converted images (step S205), already converted image data are read and displayed in the main routine. Therefore, the user can see an image converted as desired in a short time without being kept waiting until the conversion processing is completed.

In the present embodiment, the thumbnails T1 to T16 are displayed on the liquid crystal display panel 3, and the touched thumbnail is specified as an image to be subjected to the picture conversion. Alternatively, when the original images are successively, an original image may be touched, and, the displayed original image may be specified as an image to be subjected to the picture conversion.

According to the present embodiment, a digital photograph can be converted to an artwork and the converted image can be seen in a short time. In addition, a user can easily select which image is converted to which artwork style.

Second Embodiment

Figure 16:
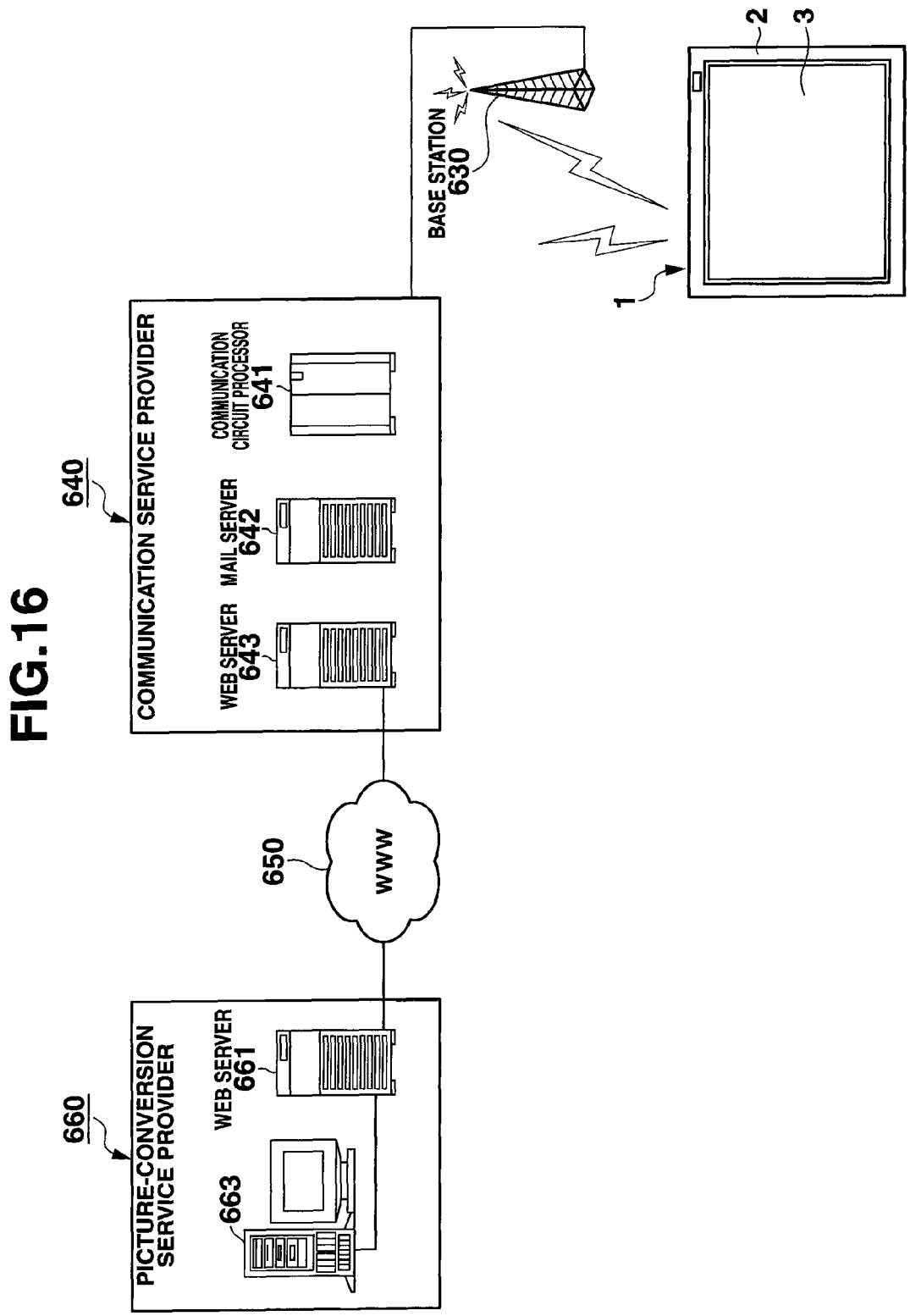
FIG. 16 is a system configuration diagram illustrating a system according to a second embodiment of the present invention.

FIG. 16 is a system configuration diagram illustrating a picture conversion service system according to the second embodiment of the present invention. In FIG. 16, the image processing apparatus 1 serving as a terminal has the same configuration as that of the first embodiment as shown in FIGS. 1 and 2. Therefore, the image processing apparatus 1 has information transmission/reception function.

The image processing apparatus 1 is connected to a communication service provider via a wireless base station 630.

The communication service provider 640 includes a communication circuit processor 641 needed for communication service, a system for connecting to WWW (Internet) 650 later explained (Web server 643), and a mail system (mail server 642). A function for allowing the age processing apparatus 1 to connect to the WWW 650 using the wireless base station 630 as an AP (access point) is also provided. The picture conversion service provider 660 also includes a system for connecting to the WWW 650 (Web server 661) and an administration server 663.

Figure 17:
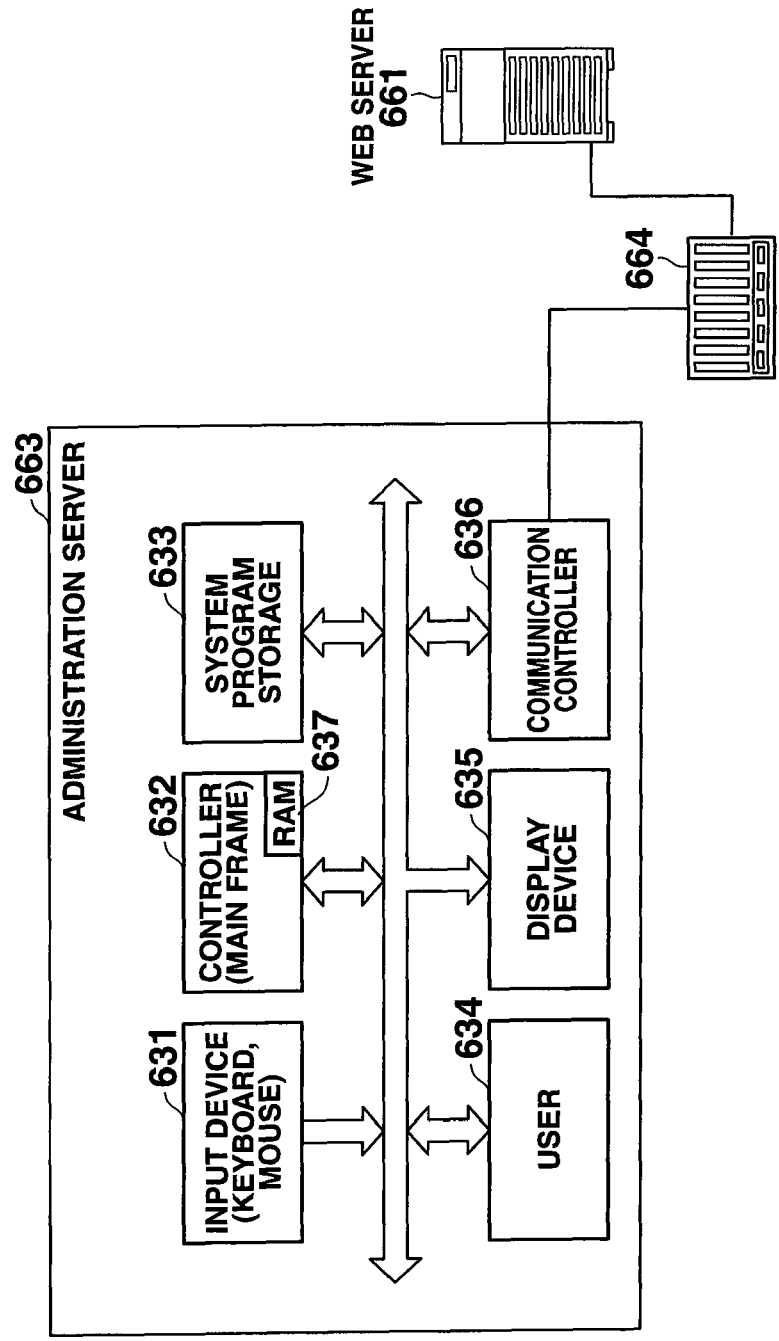
FIG. 17 is a block diagram illustrating a configuration of an administration server.

FIG. 17 is a block diagram illustrating details of the administration server 663. The Web server 661 is connected to the administration server 663 via the hub 64. The administration server 663 is a system including an input device (keyboard, mouse, and the like) 631, a controller (main frame) 632, a system program storage 633, a user administration table 634, a display device 635, and a communication controller 636, which are connected to each other via a system bus. A service for converting a received image and transmitting the image is provided, free of charge or at a cost, to the image processing apparatus 1 operated by a registered user who is registered in the user administration table 634.

The system program storage 633 stores a program for causing the controller 632 to perform operation as shown in a flowchart explained below, and also stores the picture conversion algorithm explained above.

Figure 18:
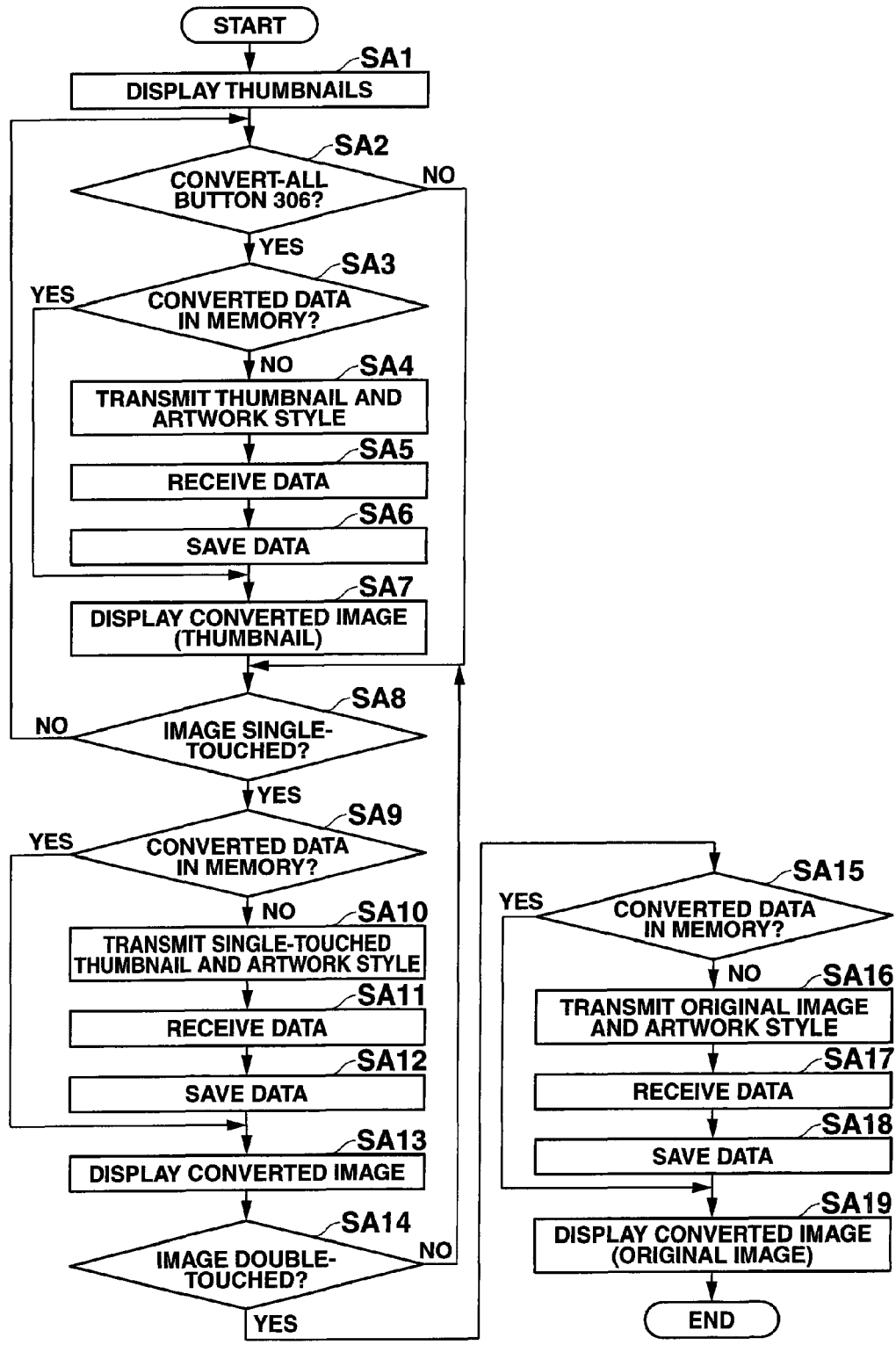
FIG. 18 is a flowchart illustrating a picture-conversion performed by an image processing apparatus according to the second embodiment.
Figure 19:
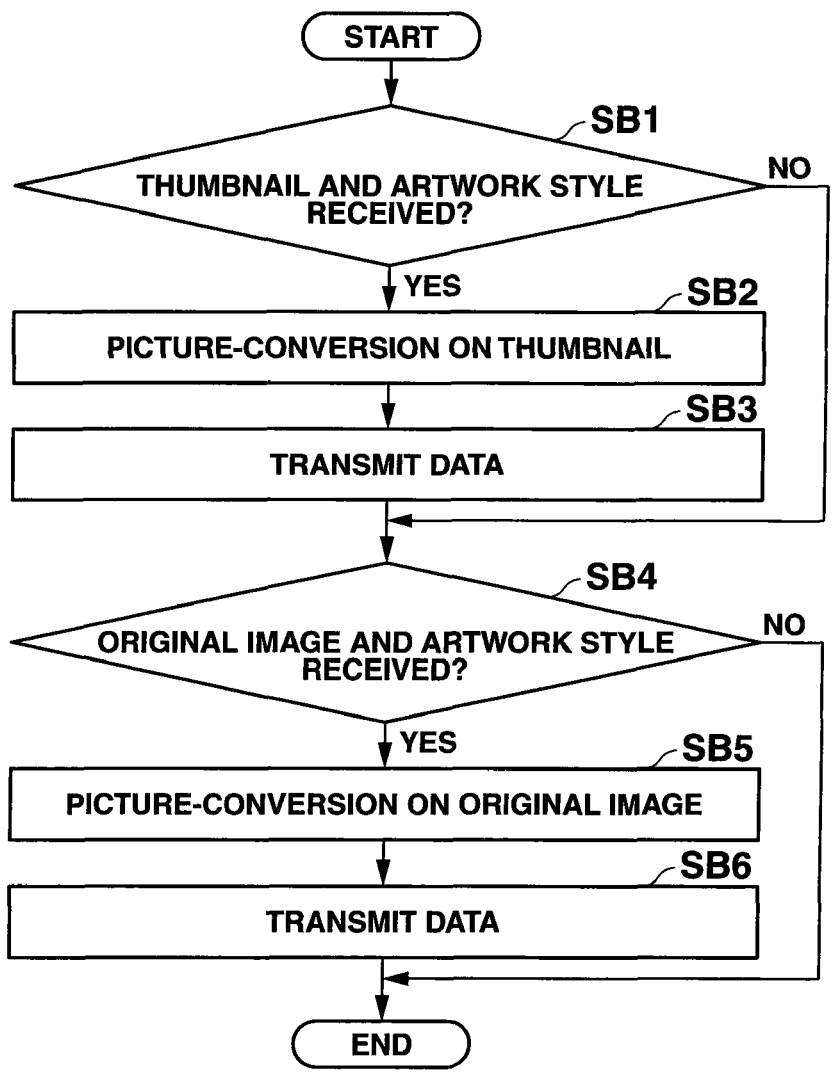
FIG. 19 is a flowchart illustrating a procedure of processing performed by the administration server according to the second embodiment.

Operation according to the present embodiment will be explained with reference to FIGS. 18 and 19. A CPU 11 of the image processing apparatus 1 executes processing as shown in the flowchart of FIG. 18 based on the program stored in the ROM 12. The administration server 663 connected to the image processing apparatus 1 executes processing as shown in the flowchart of FIG. 19 based on the program stored in the system program storage 633.

More specifically, in the effect mode, the CPU 11 reads the image files F1 to F16 to be displayed from the memory card 60, and reads image data of the original thumbnails T1 to T16 in the image files F1 to F16 as shown in the flowchart of FIG. 18. Then, based on the thumbnail image data, thumbnails are displayed on the liquid crystal display panel 3 (step SA1). Therefore, as a result of the processing in step SA1, the original thumbnails T1 to T16 are displayed as a list on the liquid crystal display panel 3 as shown in FIG. 8. The CPU 11 also displays the convert-ALL button 301 and the next page button 302 at the corner of the lower end of the liquid crystal display panel 3.

It is determined whether a user touches the convert-ALL button 301 with a hand/finger based on an output from the touch panel 5 (step SA2). When the convert-ALL button 301 is determined to be touched, it is determined whether the memory card 60 already has data of the picture-converted image (step SA3).

More specifically, in step SA4 subsequent to step SA3, the thumbnails (thumbnails T1 to T16) currently displayed on the liquid crystal display panel 3 are transmitted to the administration server 663 so that picture conversion processing for a predetermined artwork style is performed on the thumbnails in accordance with a priority of conversion which is the same as the first embodiment. Therefore, in response to the first operation of the convert-ALL button 301, the image conversion processing for "(1) Oil painting" is performed.

Image data of the oil painting thumbnails may be already stored in the memory card 60 as explained later. Therefore, in step SA3, it is determined whether the memory card 60 has the image data of the oil painting thumbnails. When the memory card 60 does not have the image data of the oil painting thumbnails, the thumbnail image data and a style of picture conversion are transmitted to the administration server 663 (step SA4) so that the thumbnails are converted to the predetermined artwork (oil painting) in accordance with the order of conversion. At this moment, none of the files T1 to F16 corresponding to the thumbnails T1 to T16 has image data of the oil painting thumbnails. Therefore, the thumbnails T1 to T16 as well as the style of artwork "Oil painting" are transmitted to the administration server 663.

On the other hand, the administration server 663 determines whether the thumbnails and the style of artwork are received or not as shown in the flowchart of FIG. 19 (step SB1). When the thumbnails (thumbnails T1 to T16) and the style of artwork are received, the picture conversion processing for the received style of artwork is performed on the received thumbnails (step SB2).

Subsequently, the image data of the thumbnails converted to an artwork generated in the processing of step SA2 is transmitted to the image processing apparatus 1 (step SB3).

Then, the CPU 11 of the image processing apparatus 1 receives the image data via the communication controller 30 (step SA5), and writes the image data into the corresponding files in the memory card 60 (step SA6). As a result of the processing of step SA5, the thumbnails converted to an artwork are attached to the files T1 to F16 and saved as shown in FIG. 5. Therefore, it is possible to prevent execution of redundant processing for performing communication to generate the same thumbnail converted to an artwork again in the interrupt routine later explained.

The picture-converted images of the oil painting style are displayed in place of the thumbnails T1 to T16 currently displayed on the liquid crystal display panel 3 (step SA7). As a result of the processing in step SA7, the display screen of the liquid crystal display panel 3 changes from the state as shown in FIG. 13A to the state as shown in FIG. 13B, so that the thumbnails Ta1 to Ta16 converted to the oil painting are displayed on the liquid crystal display panel 3. Therefore, the user can see the thumbnail images converted to the oil painting in a short time.

In step SA8 subsequent to step SA7, it is determined whether any one of the thumbnails is single-touched. When none of them is single-touched, processing of step SA2 and subsequent steps are repeated. Therefore, when the user touches the convert-ALL button 301 again in the display state as shown in FIG. 14A, the thumbnails and the style of artwork "Thick oil painting" are transmitted to the administration server 663 in response to the second operation of the convert-ALL button 301 (step SA4).

The administration server 663 transmits the image data obtained by converting the thumbnails into the thick oil painting. As a result of the processing in step SA7, the display screen of the liquid crystal display panel 3 changes from the state as shown in FIG. 14A to the state as shown in FIG. 14B, so that the thumbnails Tb1 to Tb16 converted to the thick oil painting are displayed on the liquid crystal display panel 3. Therefore, the user can see the thumbnail images converted to the thick oil painting in a short time.

As described above, when a user touches one of the picture-converted images once while the picture-converted images are displayed, the touch panel 5 detects the thumbnail single-touched by the user, and the CPU 11 determines that the result is YES in step SA8. Then, the CPU 11 subsequently determines as to whether the memory card 60 already has the data (step SA9).

That is, in step SA10 subsequent to step SA9, the single-touched thumbnails are transmitted so that the picture conversion processing is executed on the thumbnails single-touched. It is assumed that a user single-touches the thumbnail T7 and the thumbnail T8 while the thumbnails T1 to T16 are displayed as shown in FIG. 9A. In this case, since the oil painting is "1" in the order of conversion, the thumbnail T7 and the thumbnail T8 are transmitted to be subjected to the picture conversion processing so that they are converted to the oil painting.

Image data of the thumbnail Ta7 and the thumbnail Ta8 converted to the oil painting may be already stored in the memory card 60 as explained later. Therefore, in step SA8, it is determined whether the memory card 60 has image data obtained by converting the thumbnails into the oil painting. Only when the memory card 60 is determined not to have the image data, the thumbnails corresponding to the single-touched picture image and the style of artwork into which the thumbnails are converted are transmitted (step SA10).

The administration server 663 determines whether the thumbnails and the style of artwork are received or not as shown in the flowchart of FIG. 19 (step SB1). When the thumbnails and the style of artwork are received, the picture conversion processing for the received style of artwork is performed on the received thumbnails (step S82).

Subsequently, the image data of the thumbnails converted to an artwork generated in the processing of step SB2 are transmitted to the image processing apparatus 1 (step SB3).

Then, the CPU 11 of the image processing apparatus 1 receives the image data via the communication controller 30 (step SA11), and writes the image data into the corresponding files in the memory card 60 (step SA12). As a result of the processing of step SA6, the thumbnails converted to an artwork are attached to the files F1 to F16 and saved as shown in FIG. 5. Therefore, it is possible to prevent execution of redundant processing for performing communication to generate the same thumbnail converted to an artwork again in the interrupt routine later explained.

Thereafter, the picture-converted images of the oil painting style are displayed in place of the thumbnails T7 and T8 currently displayed on the liquid crystal display panel 3 (step SA13). As a result of the processing in step SA13, the display screen or the liquid crystal display panel 3 changes from the state as shown in FIG. 9A to the state as shown in FIG. 9B, so that the thumbnails Ta7 and Ta8 converted to the oil painting style are displayed on the liquid crystal display panel 3 in place of the thumbnails T7 and T8.

Subsequently, it is determined whether any one of the thumbnails is double-touched (touched twice successively) (step SA14). When none of them is double-touched, step SA8 is subsequently performed. When a user single-touches the oil painting thumbnail Ta8 in the display state as shown in FIG. 10A, and there is no data, the image processing apparatus 1 transmits the oil painting thumbnail Ta8 so that the oil painting thumbnail Ta8 is subjected to the picture conversion processing to be converted to thick oil painting since the order of conversion subsequent to (1) Oil painting is (2) Thick oil painting (step SA11), whereby the administration server 663 performs the conversion processing (step SB2).

More specifically, the administration server 663 performs the picture conversion processing on the oil painting thumbnail Ta8 using the picture conversion algorithm stored in the system program storage 633, thereby generating the picture-converted image data. On the basis of the generated picture-converted image data, the picture-converted image of the thick oil painting style is generated. Thereafter, the data are transmitted (step SB3).

Then, the image processing apparatus 1 receives the data (step SA11). After the data are stored (step SA12), the thumbnail converted to the thick nil painting style thus generated is displayed in place of the oil painting thumbnail Ta8 currently displayed on the liquid crystal display panel 3 (step SA13). As result of the processing in step SA11, the display screen of the liquid crystal display panel 3 changes from the state as shown in FIG. 10A to the state as shown in FIG. 10B, so that the thick oil painting thumbnail Tb8 is displayed on the liquid crystal display panel 3 in place of the oil painting thumbnail Ta8.

The CPU 11 does not perform the picture conversion processing, and performs only the transmission/reception of the data, which does not take a long time. Therefore, the user can see the images converted to desired artwork styles in a short time.

With a single touch operation, the user can easily select which image is converted to which artwork style. Therefore, the user can instantly try various conversions to determine which artwork style is suitable for an original image corresponding to a thumbnail.

When the user double-touches any one of the images while images of at least two artwork styles are displayed as described above, the touch panel 5 detects the thumbnail touched by the user, and the CPU 11 determines that the result is YES in step SA14. Then, the CPU 11 subsequently performs step SA15 after step SA14, and it is determined whether the memory card 60 already has original size image data converted to the double-touched artwork style.

In step SA16 subsequent to step SA15, data transmission is executed to perform the picture conversion processing on the original size image corresponding to the double-touched thumbnail having being converted to the artwork so that the original size image is converted to the double-touched artwork style. Image data obtained by converting the original size image into the artwork style may be already stored in the memory card 60. Therefore, in step SA15, it is determined whether the memory card 60 has image data obtained by converting the original image corresponding to the double-touched thumbnail having being converted to the artwork. Only when the memory card 60 is determined not to have the image data, the processing from step SA16 to SA18 are executed.

The original size image corresponding to the double-touched thumbnail having being converted to the artwork and the style of artwork into which the original image is converted are transmitted (step SA16).

More specifically, as shown in FIG. 12A, it is assumed that a user double-touches the gothic oil painting thumbnail Tc8. In this case, first, the CPU 11 searches the file F8 including the gothic oil painting thumbnail Tc8 from the memory card 60, and reads an original image I8 from the found file F8. In this case, the artwork style into which the image is to be converted is the gothic oil painting style since the gothic oil painting thumbnail Tc8 is double-touched. Accordingly, the style of artwork into which the image is converted is determined as "gothic oil painting style". Then, the original image I8 having been read from the found file F8 and the style of artwork "gothic oil painting style" are transmitted to the administration server 663.

On the other hand, the administration server 663 determines whether the original image and the style of artwork are received or not as shown in the flowchart of FIG. 19 (step SB4). When the original image I8 and the style of artwork (gothic oil painting style) are received, the picture conversion processing for the received style of artwork is performed on the received original image (step SB5).

In the same manner as the above embodiments, the picture conversion processing is performed on the received original image, thereby generating the picture-converted image data. On the basis of the generated picture-converted image data, the picture-converted image of the gothic oil painting style is generated. Subsequently, the original size image data converted to an artwork generated in the processing of step SB5 is transmitted to she image processing apparatus 1 (step SB6).

The image processing apparatus 1 receives the image data transmitted from the administration server 663 (step SA17), and writes the received image data of the original image converted to an artwork into the corresponding file in the memory card 60 (step SA18). As a result of the processing of step SA18, the original size image Ic8 converted to an artwork is attached to the file F8 and saved as shown in FIG. 6. As a result, it is possible to prevent execution of redundant transmission/reception processing for generating the same original image converted to an artwork again in the interrupt routine later explained.

Then, the image of the original size image Ic8 converted to the gothic oil painting is displayed in full screen in place of the thumbnails including a gothic oil painting thumbnail Tc8 currently displayed on the liquid crystal display panel 3 (step SA19). Therefore, as a result of the processing in step SA16, the display screen of the liquid crystal display panel 3 changes from the state as shown in FIG. 12A to the state as shown in FIG. 12B, so that the original size image Ic8 of the gothic oil painting style is displayed on the liquid crystal display panel 3.

With a single touch operation on the thumbnail display screen, the user can easily select which image is converted to which artwork style, and furthermore the user cart instantly try various conversions and convert the original image into an artwork that the user thinks is suitable at last.

Figure 20:
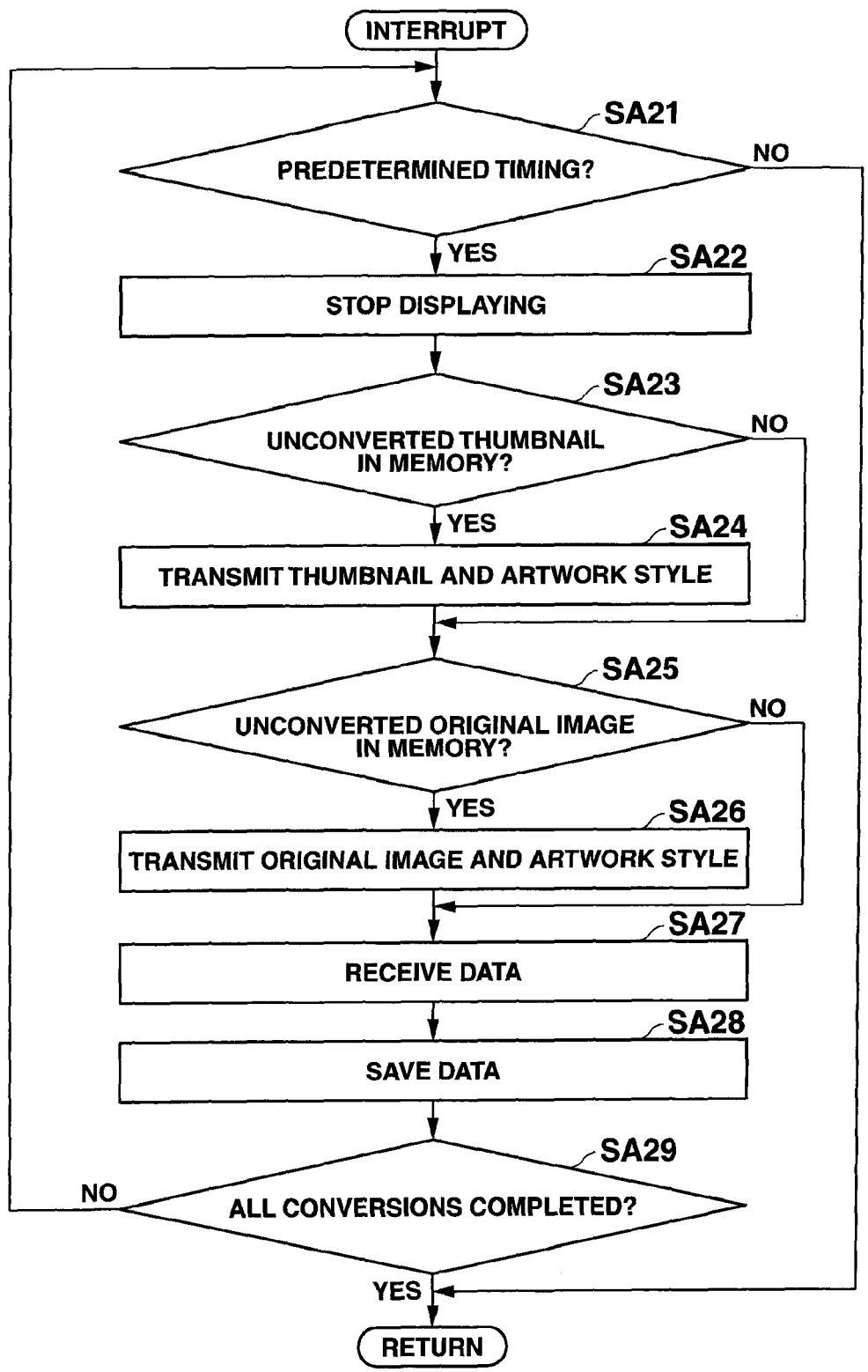
FIG. 20 is a flowchart illustrating a procedure of interrupt processing performed by the image processing apparatus according to the second embodiment.

The CPU 11 of the image processing apparatus 1 interrupts the main routine with a constant interval of time, and executes the interrupt processing in accordance with the flowchart as shown in FIG. 20. In other words, the CPU 11 determines whether it is a predetermined timing or not (step SA21). In this case, the determination as to whether it is a predetermined timing or not is made in the same manner as the first embodiment described above.

When it is not determined to be the predetermined timing, the CPU 11 returns back to the main routine without executing the subsequent processing. On the other hand, when it is determined to be the predetermined timing, the CPU 11 stops displaying the image data on the liquid crystal display panel 3 (step SA22), and then, searches the memory card 60 to determine whether there is any thumbnail that is not yet converted to an artwork (step SA23). When it is determined that there is a thumbnail that is not yet converted to an artwork, the thumbnail and the style of artwork into which the thumbnail is not yet converted are transmitted (step SA24).

Then, the CPU searches the memory card 60 to determine whether there is any original image that is not yet converted to an artwork (step SA25). When it is determined that there is an original image that is not yet converted to an artwork, the original image and the style of artwork are transmitted (step SA26).

Then, the controller 632 of the administration server 663 executes the processing in accordance with the flowchart as shown in FIG. 19 in the same manner as described above. When the thumbnail and the style of artwork are received (step SB1; YES), the received thumbnail is converted to the received style of artwork (step SB2), and the converted data is transmitted (step SB3). When the original image and the style of artwork are received (step SB4; YES), the received original image is converted to the received style of artwork (step SB5), and the converted data is transmitted (step SB6).

Then, the CPU 11 of the image processing apparatus 1 receives the data from the administration server 663 (step SA27), and writes the data into the corresponding files F1 to F16 (step S28).

As described above, the interrupt processing is performed, so that when a user inputs a conversion instruction to see converted images, already converted image data is read and displayed. Therefore, the user can see an image converted as desired in a short time without being kept waiting until the conversion processing is completed.

Third Embodiment

The present embodiment has the same configuration as that of the picture conversion service system as shown in FIGS. 16 and 17. The second embodiment is different from the first embodiment in that the ROM 12 of the image processing apparatus 1 does not store the picture conversion algorithm for conversion into (1) Oil painting, (2) Thick oil painting, (3) Gothic oil painting, (4) Fauvist oil paining, (5) Water color painting, (6) Gouache painting, (7) Pastel painting, (8) Color pencil sketch, (9) Pointillism, (10) Silkscreen, (11) Drawing, and (12) Air brush, and the ROM 12 of the image processing apparatus 1 stores only the styles thereof and the order of conversion from (1) Oil painting to (12) Air brush. In contrast, the third embodiment is the same as the first embodiment in that the ROM 12 of the image processing apparatus 1 stores the picture conversion algorithm for conversion into the artwork styles (1) Oil painting to (12) Air brush.

When a user specifies a thumbnail by single-touching the thumbnail to perform the picture conversion, the picture conversion processing performed in the image processing apparatus 1 in the same manner as the first embodiment. When a user specifies a thumbnail by double-touching it to perform the picture conversion on image data of an original image, the image data is transmitted to the administration server 663, and the picture conversion processing is performed in the administration server 663.

Therefore, the picture conversion processing of a thumbnail, which requires less processing power, is performed in the terminal, and the picture conversion processing of an original image, which much processing power, is performed in the server. This configuration enables efficient work distribution.

Since, the detailed flowchart is the same as that of the first or the second embodiment, detailed description thereof is omitted.

The image data converted to an artwork by the administration server 663 may be returned back to the image processing apparatus 1, or the picture conversion service provider 660 may provide print service to generate a printed copy in the artwork style and mail the printed copy to the user.

Fourth Embodiment

Subsequently, a specific operation of the image processing apparatus 1 in the effect mode according to the fourth embodiment will be hereinafter explained.

Figure 21:
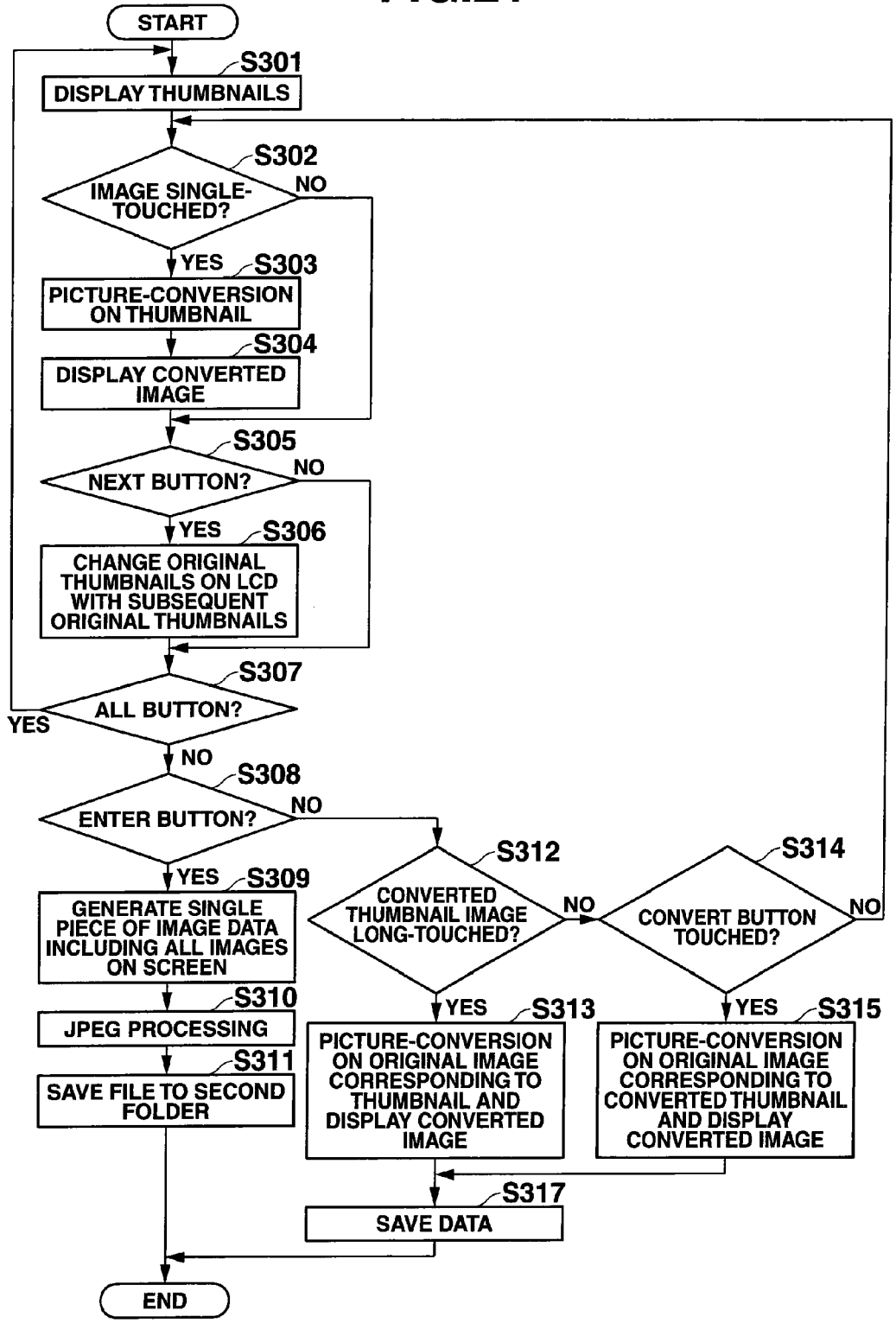
FIG. 21 is a flowchart illustrating a picture-conversion performed by an image processing apparatus according to the fourth embodiment of the present invention.

FIG. 21 is a flowchart illustrating a procedure of processing performed by the CPU 11 set in the effect mode according to the present embodiment. In the effect mode, the CPU 11 executes processing as shown in FIG. 21 in accordance with the program stored in a ROM 12.

Figure 22A:
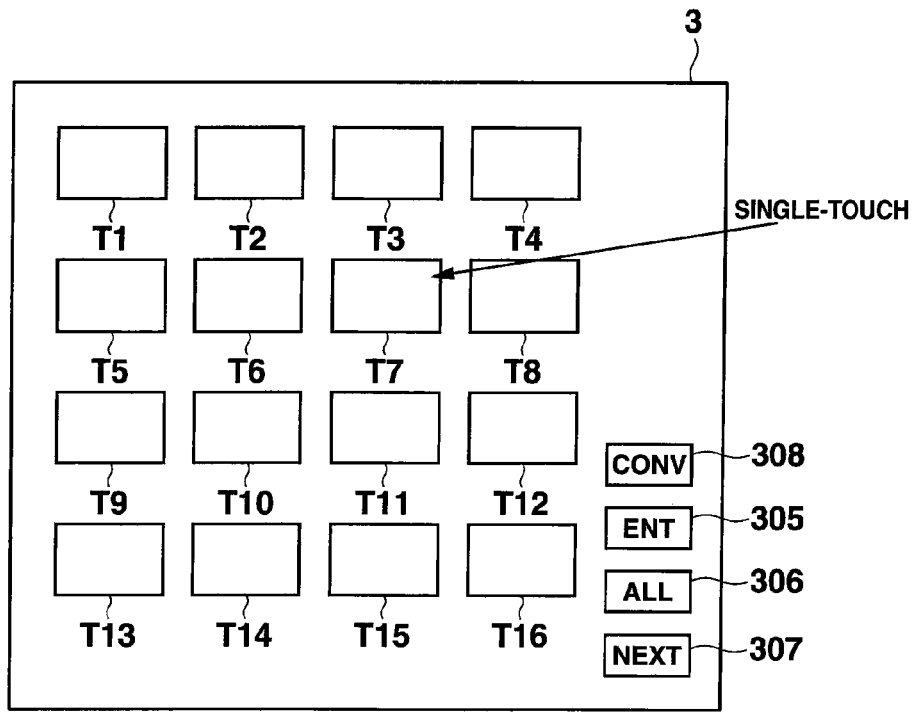
FIG. 22A is a display transition diagram of the liquid crystal display panel according to the fourth embodiment.

The CPU 11 reads, from a memory card 60, thumbnail image data T1 to T16 in the image files F1 to F16 to be displayed. Then, based on these thumbnail image data, thumbnails are displayed on the liquid crystal display panel 3 (step S301). As a result of the processing in step S301, the thumbnails T1 to T16 are displayed as a list on the liquid crystal display panel 3 as shown in FIG. 22A. The CPU 11 also displays an ENTER button 305, an ALL button 306, a NEXT button 307, and a CONVERT button 308 at a right end of the liquid crystal display panel 3. The CONVERT button 308 is a button for converting all the original images corresponding to the picture-converted thumbnails displayed on the liquid crystal display panel 3 into a specified artwork style at a time.

Subsequently, it is determined whether a single-touch (for example, a touch within one second, i.e., a predetermined time), i.e., a specifying operation performed on any one of the thumbnail images (16 images) currently displayed on the liquid crystal display panel 3, is detected or not (step S302). When the single-touch on any one of the thumbnail images is detected, the thumbnail is converted to an artwork (step S03). In this case, since the oil painting style is "1" in the order of conversion, the thumbnail is subjected to the picture conversion processing to be converted to the oil painting.

Figure 22B:
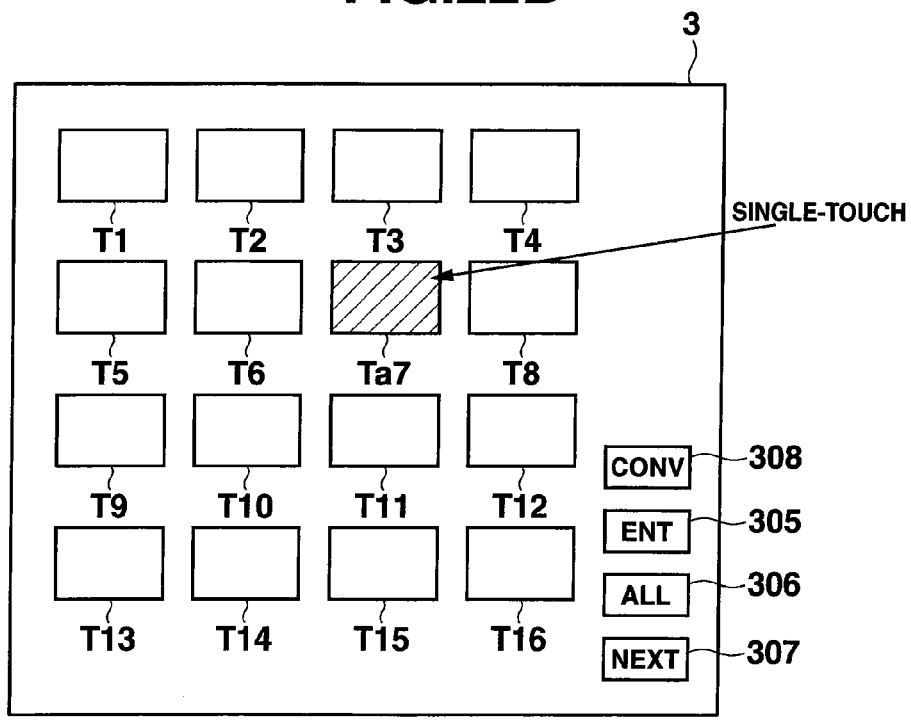
FIG. 22B is a display transition diagram of the liquid crystal display panel subsequent to FIG. 22A.

Subsequently, the picture-converted image is displayed on the liquid crystal display panel 3 (step S304). Therefore, when a user single-touches the thumbnail T7 while the thumbnails T1 to T16 are displayed on the liquid crystal display panel 3 as shown in FIG. 22A, the display state changes to the display state as shown in FIG. 22B. As a result, the original thumbnails T1 to T6, the oil painting thumbnail Ta7, and the original thumbnails T8 to T16 are displayed on the liquid crystal display panel 3.

It is determined whether the NEXT button 307 is touched or not (step S305), whether the ALL button 306 is touched or not (step S307), whether the ENTER button 305 is touched or not (step S308), whether any one of the picture-converted images is long-touched (for example, continuous touch for two or more seconds, i.e., a predetermined time or more) or not (step S312), and whether the CONVERT button 308 is touched or not (step S314). When none of these buttons 305, 306, 307, and 308 is touched, and none of the picture-converted images is long-touched, processing of step S302 is subsequently performed after step S314.

Figure 23A:
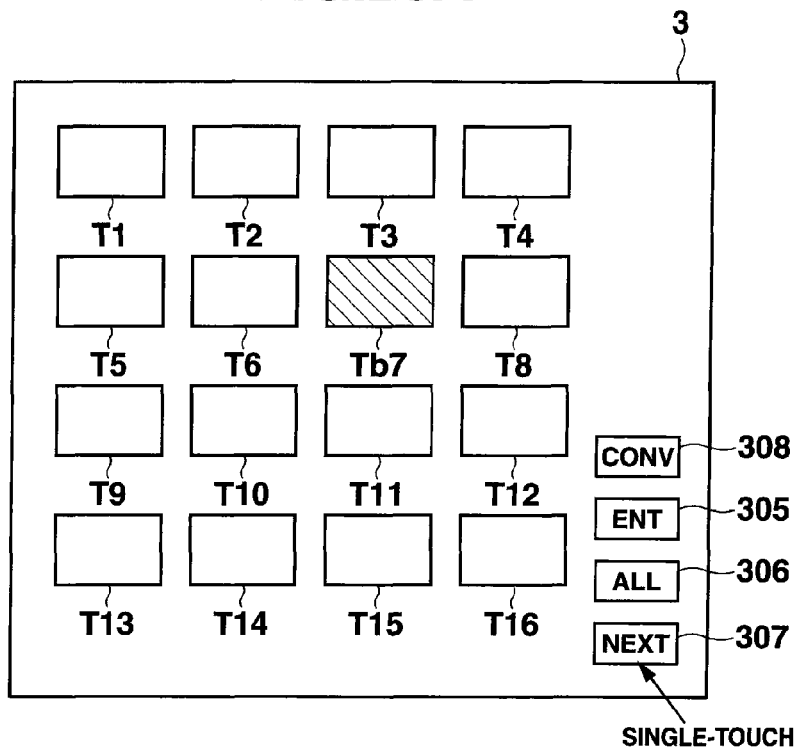
FIG. 23A is a display transition diagram of the liquid crystal display panel subsequent to FIG. 22B.

Therefore, when a user single-touches the oil painting thumbnail Ta7 in the display state as shown in FIG. 22B, the determination made in step S302 is YES. The oil painting thumbnail Ta7 is subjected to the picture conversion processing to be converted to the thick oil painting style since the order of conversion subsequent to (1) Oil painting is (2) Thick oil painting (step S303). This picture-converted image is displayed on the liquid crystal display panel 3 (step S304). Therefore, the display state as shown in FIG. 22B changes to the display state as shown in FIG. 23A, whereby the thick oil painting thumbnail Tb7 is displayed on the liquid crystal display panel 3 in place of the oil painting thumbnail Ta7. As a result, the original thumbnails T1 to T6, the thick oil painting thumbnail Tb7, and the original thumbnails T8 to T16 are displayed.

Therefore, the user can see the image converted to a desired artwork style in a short time, and furthermore the user can easily select which image is converted to which artwork style.

A thumbnail having 160×120 pixels can sufficiently express the nuances of the artwork style. When the display screen of the liquid crystal display panel 3 of the image processing apparatus 1 is larger, i.e., three lines by three columns, a thumbnail of QVGA size (320×240 pixels) may also be possible.

When a user touches the NEXT button 307 in the display state as shown in FIG. 23A, the determination made in step S305 is YES. Therefore, the CPU 11 proceeds from step S305 to step S306 to change images (original thumbnails) except the picture-converted thumbnail image Tb7 among the sixteen images displayed on the liquid crystal display panel 3 to subsequent fifteen thumbnails.

Figure 23B:
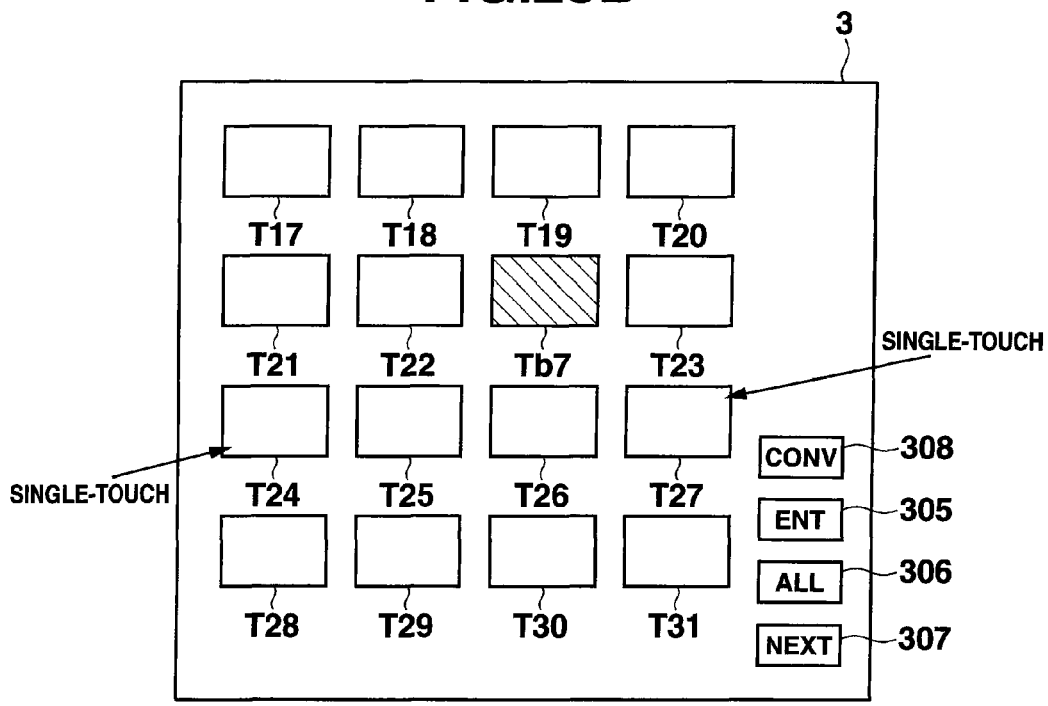
FIG. 23B is a display transition diagram of the liquid crystal display panel subsequent to FIG. 23A.

Therefore, the liquid crystal display panel 3 changes from the display state of FIG. 23A to the display state of FIG. 23B, whereby the original thumbnails T1 to T6 and T8 to T16 except the thick oil painting thumbnail Tb7 are replaced with original thumbnails T17 to T31 read from subsequent files F17 to F31.

Therefore, when the user touches the NEXT button 307, the picture-converted image (thick oil painting thumbnail Tb7) converted to an artwork as desired by the user is maintained as it is, while the other original thumbnails which are not desired to be converted to an artwork are changed to the new thumbnails. As a result, even after the user converts the desired thumbnail into the desired artwork, the user can further continue operation for converting the other thumbnails into a desired artwork.

In FIGS. 23A and 23B, response to the touch on the NEXT button 307, the page is turned over, whereby all the thumbnails other than the picture-converted image (thick oil painting thumbnail Tb7) are changed. However, as described above, the thumbnails may not be turned over in units of pages. The thumbnails may be scrolled in units of lines or columns, or may be scrolled seamlessly little by little. Therefore, for example, when the page is scrolled one line (in unit of line) in the upward direction in the state of FIG. 23A, the line including the thumbnails T1 to T4 at the top disappear, and four subsequent thumbnails T17 to T20 are displayed below the line including the thumbnail T13 to T16 at the bottom.

When the line including the picture-converted image (thick oil painting thumbnail Tb7) is scrolled to the outside of the screen, the thick oil painting thumbnail Tb7 remains in the line, but the other original thumbnails are erased.

When the user single-touches a thumbnail T24 and a thumbnail T27 in the display state as shown in FIG. 23B, the determination made in step S302 is YES. Therefore, the CPU 11 proceeds the processing from step S302 to step S303 to convert the thumbnails T24 and T27 single-touched into an artwork (step S303). The thumbnail 24 and the thumbnail 27 are single-touched. In this case, since the thumbnail 24 and the thumbnail 27 are touched for the f ret time, and the oil painting is "1" in the order of conversion, the thumbnails T24 and T27 are subjected to the picture conversion processing to be converted to the oil painting.

Figure 24A:
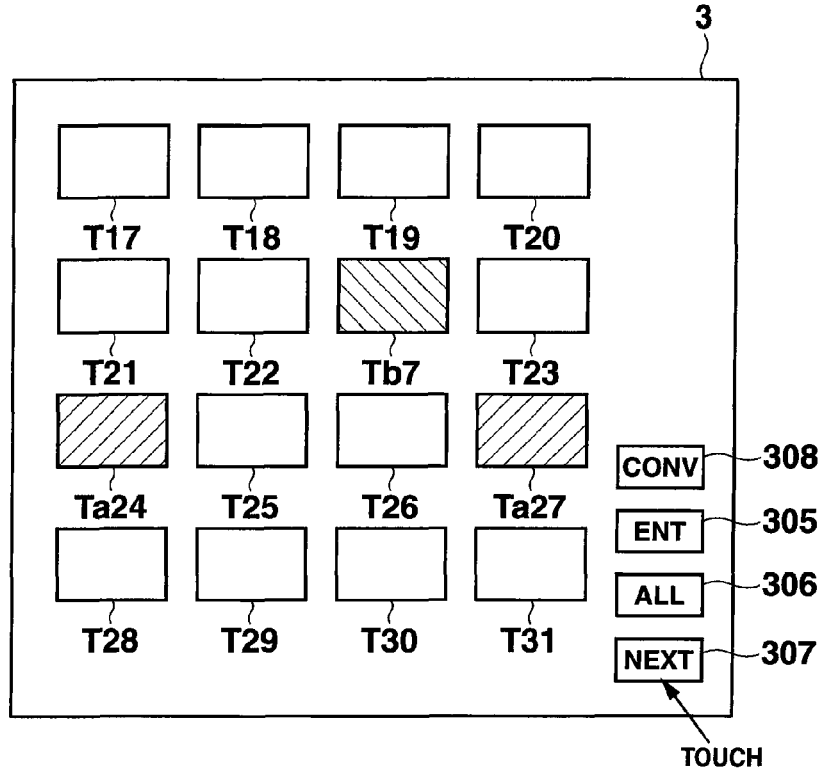
FIG. 24A is a display transition diagram of the liquid crystal display panel subsequent to FIG. 23B.

Subsequently, the picture-converted image is displayed on the liquid crystal display panel 3 (step S304). Therefore, the display state as shown in FIG. 23B changes to the display state as shown in FIG. 24A. More specifically, the original thumbnails T24 and T27 on the liquid crystal display panel 3 are replaced with oil painting thumbnails Ta24 and Ta27, whereby the original thumbnails T17 to 122, the thick oil painting thumbnail Tb7, the original thumbnail T23, the oil painting thumbnail Ta24, the original thumbnails T25, T26, the oil painting thumbnail Ta27, and the original thumbnails T28 to T31 are displayed on the liquid crystal display panel 3.

When the user touches the NEXT button 307 in the display state as shown in FIG. 24A, the determination made in step S305 is YES. Therefore, the CPU 11 proceeds from step S305 to step 2306 to change the images (original thumbnails) except the picture-converted image among the sixteen images displayed on the liquid crystal display panel 3 to subsequent original thumbnails.

Figure 24B:
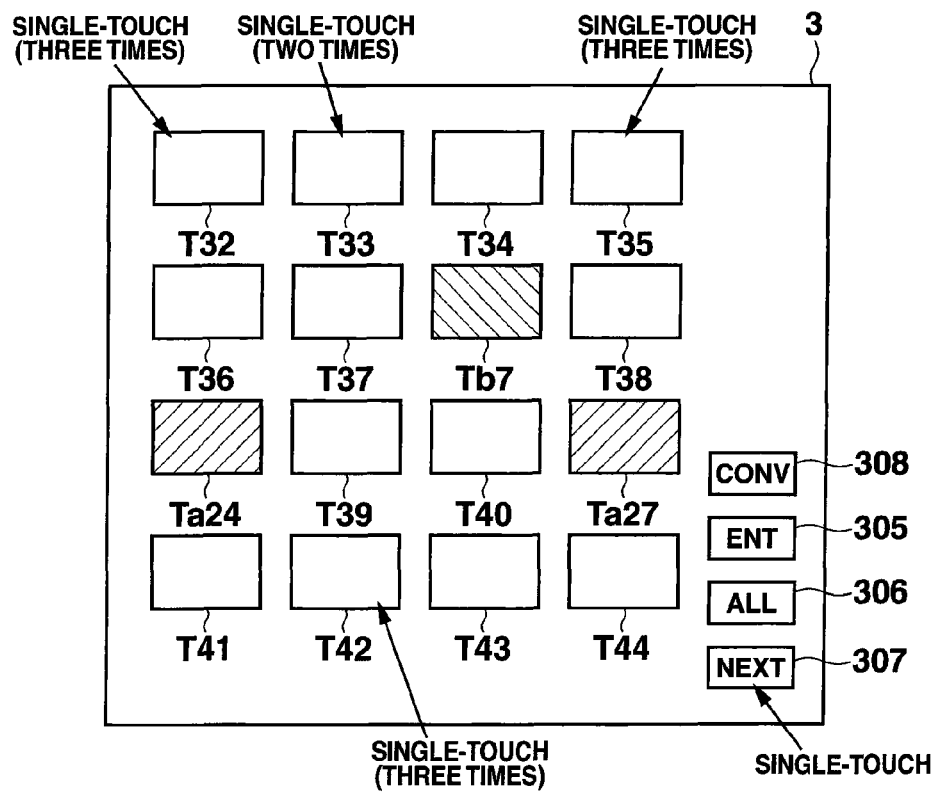
FIG. 24B is a display transition diagram of the liquid crystal display panel subsequent to FIG. 24A.

Therefore, the liquid crystal display panel 3 changes from the display state of FIG. 24A to the display state of FIG. 24B, whereby displayed on the liquid crystal display panel 3, the original thumbnails T17 to T22, T23, T25, T26, T28 to T31 except the thick oil painting thumbnail Tb7 and the oil painting thumbnails Ta24 and Ta27 are replaced with original thumbnails T32 to T44 read from subsequent thirteen files F32 to F44.

Therefore, when the user touches the NEXT button 307, the picture-converted image (the thick oil painting thumbnail Tb7 and the oil painting thumbnails Ta24 and Ta27) converted to an artwork as desired by the user is maintained as they are, while the other thumbnails (original thumbnails T17 to T22, T23, T25, T26, T28 to T31) which are not desired to be converted to an artwork are changed to the new thumbnails (original thumbnails T32 to T44). As a result, even after the user converts the desired thumbnail into the desired artwork style, the user can further continue operation for converting the other thumbnails into a desired artwork style.

Further, as shown in FIG. 24B, it is assumed that a user does as follows.

1) The user single-touches an original thumbnail T32 totally three times, 2) the user single-touches an original thumbnail T33 totally twice, 3) the user single-touches an original thumbnail T35 totally three times, and 4) the user single-touches an original thumbnail T42 totally three times.

In this case, every time a single-touch on a thumbnail is detected, the processing of step S303 and the processing of step S304 are executed.

Figure 25A:
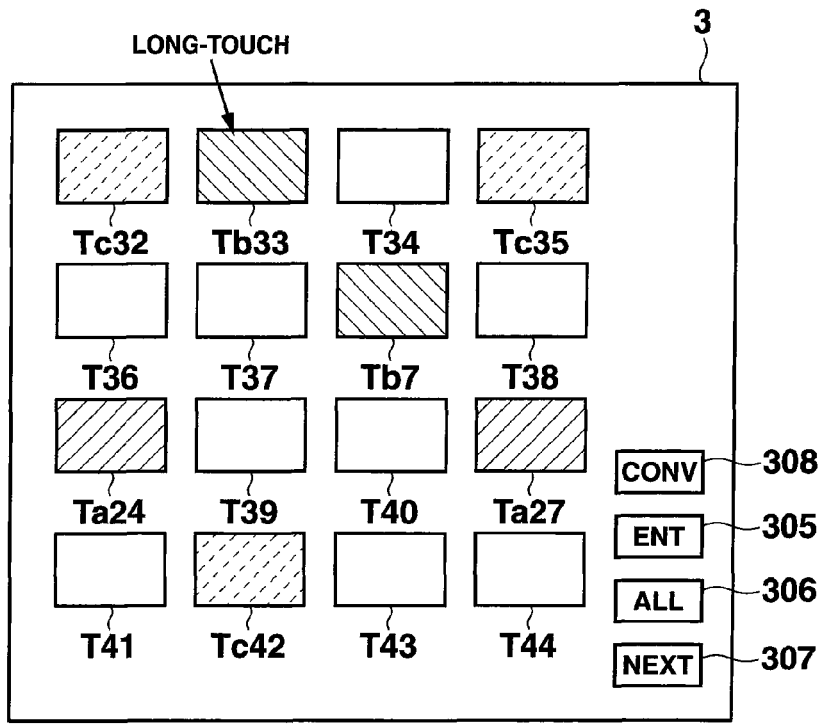
FIG. 25A is a display transition diagram of the liquid crystal display panel subsequent to FIG. 24B.

Therefore, the display state of FIG. 24B changes to the display state of FIG. 25A.

1) The original thumbnail T32 single-touched totally three times is displayed upon being converted to a pastel drawing thumbnail Tc32 in accordance with the order of conversion "(3) Gothic oil painting", 2) the original thumbnail T33 single-touched totally twice is displayed upon being converted to a water color painting thumbnail Tb33 in accordance with the order of conversion "(2) Thick oil painting", 3) the original thumbnail T35 single-touched totally three times is displayed upon being converted to a pastel drawing thumbnail Tc35 in accordance with the order of conversion "(3) Gothic oil painting", and 4) the original thumbnail T42 single-touched totally three times is displayed upon being converted to a pastel drawing thumbnail Tc42 in accordance with the order of conversion "(3) Gothic oil painting".

The original thumbnails T34, T36, and T37, the water color painting thumbnail Tb7, the original thumbnail T38, the oil painting thumbnail Ta24, original thumbnails T39 and T40, the oil painting thumbnail Ta27, and the original thumbnails T41, T43, and T44 are continued to be displayed as they are since they are not single-touched.

When a user touches the ENTER button 305, the determination made in step S308 is YES. Therefore, the CPU 11 proceeds from step S308 to stop S309 and subsequent steps. More specifically, when the ENTER button 305 is touched, a single piece of image data including all the images displayed on the screen of the liquid crystal display panel 3 is generated (step S309).

Figure 25B:
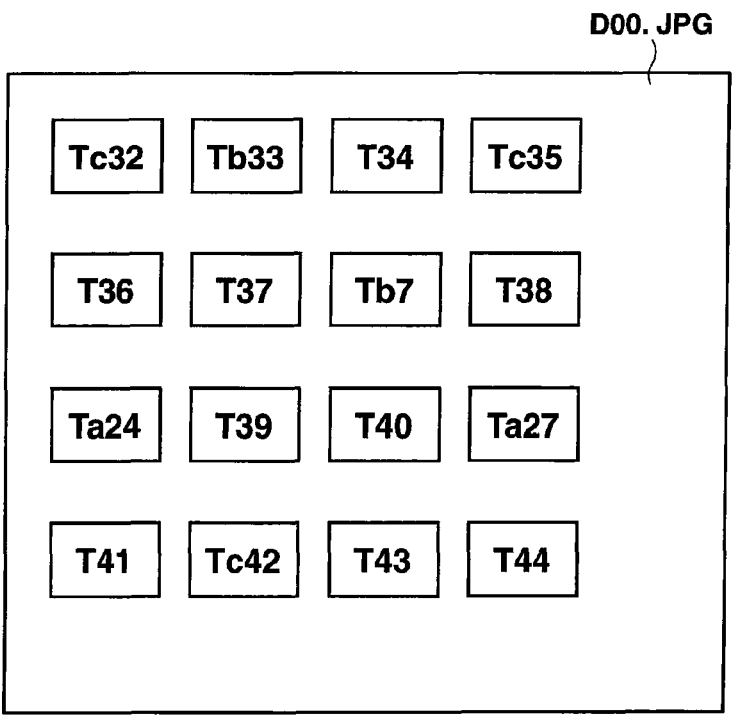
FIG. 25B is a display transition diagram of the liquid crystal display panel subsequent to FIG. 25A.

Therefore, for example, when a user touches the ENTER button 305 in the display state of FIG. 25A, all the images include sixteen thumbnail images as shown in FIG. 25B, i.e., the gothic oil painting thumbnail Tc32, the thick oil painting thumbnail Tb33, the original thumbnail T34, the gothic oil painting thumbnail Tc35, the original thumbnails T36 and T37, the thick oil painting thumbnail Tb7, the original thumbnail T38, the oil painting thumbnail Ta24, the original thumbnails T39 and T40, the oil painting thumbnail Ta27, the original thumbnail T41, the gothic oil painting thumbnail Tc42, and the original thumbnails T43 and T44. Therefore, in step S309, a single piece of image data D00 capable of representing these sixteen images is generated as shown in FIG. 25B.

Figure 26:
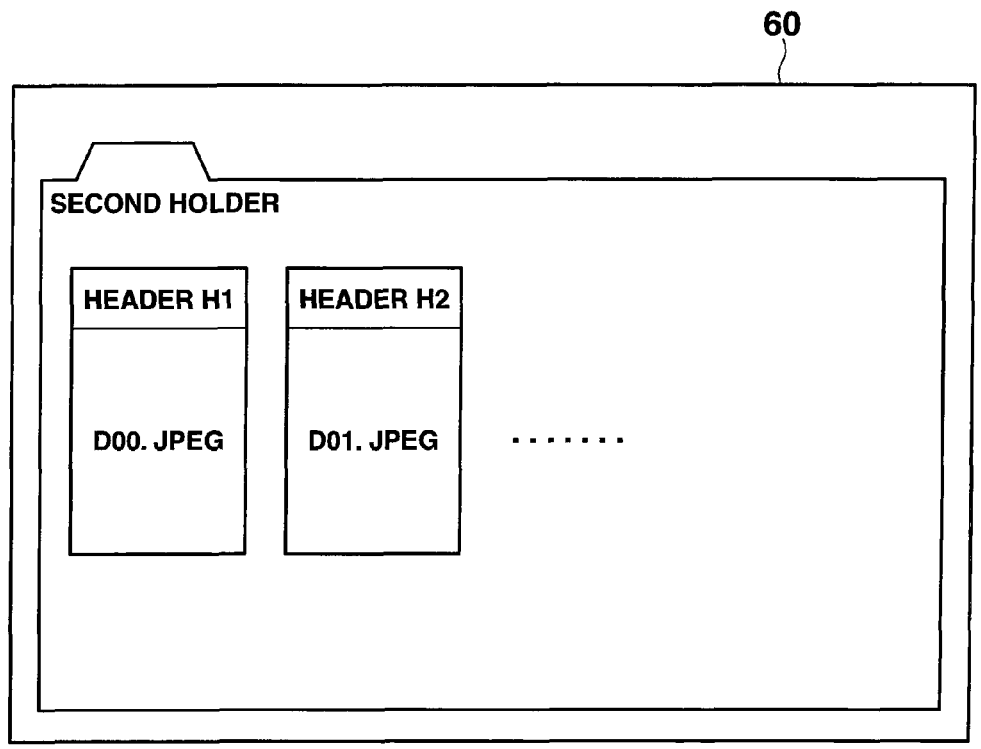
FIG. 26 is a figure illustrating the content of storage in a memory card according to the fourth embodiment.

Further, the CPU 11 processes the generated image data D00 in accordance with JPEG method to compress the generated image data D00 (step S310). As a result of the processing of step S310, image data file "D00. JPEG" in JPEG format is generated from the image data D00. The generated image data file in JPEG format is written into the second folder in the memory card 60 (step S311). As a result of the processing of step S310, image data file "D00.JPEG" in JPEG format is written into the second folder in the memory card 60 as shown in FIG. 26. Like the first, second, and third embodiments, the first folder in the memory card 60 includes taken image files F.

Since the image data file "D00.JPEG" stored in the second folder is image data in JPEG format, the original thumbnails T34, T36, T37, T38, T39, T40, T41, T43, and T44 and the picture-converted thumbnails Tc32, Tb33, Tc35, Tb7, Ta24, Ta27, and Tc42 can be reproduced and displayed when the memory card 60 is detached from the image processing apparatus 1 and attached to another image processing apparatus and the like. Therefore, other apparatuses can display images converted to desired artwork styles by this image processing apparatus 1 in a short time, and other apparatuses can enjoy this advantage. In this case, JPEG is explained as an example of predetermined format. However, the format is not limited to JPEG. Images in predetermined formats generated by the image processing apparatus 1 can also be displayed on other image processing apparatuses via memory cards.

It should be noted that even though another apparatus displays an image based on image data file "D00.JPEG", the image data are made of a single JPEG image, which merely allows a user to quickly recognize the overall atmosphere and does not allow the user to select one reduced image therein.

When a user touches the ALL button 306, the determination made in step S307 is YES. Accordingly, the CPU 11 returns back from step S307 to step S302 to execute the processing again from the beginning. Therefore, when a user thinks that it is necessary to perform the picture conversion processing all over again from the beginning, the user can discard the picture conversion processing until then and perform the picture conversion processing from the beginning by touching the ALL button 306.

When the user long-touches any one of the picture-converted images without touching the ENTER button 305, the ALL button 306, and the CONVERT button 308, the determinations made in step S307 and step S308 are NO, and the determination made in step S312 is YES. Therefore, the CPU 11 proceeds from step S312 to step S313 to convert an original image corresponding to the picture-converted thumbnail into an artwork and displays the picture-converted original image.

More specifically, when the thick oil painting thumbnail Tb33 is long-touched in the state of FIG. 25A, the original image corresponding to the thick a oil painting thumbnail Tb33 is an original image I33. Therefore, image data obtained by converting the original image I33 into the thick oil painting is generated, and the converted original size image is displayed (step S313). Subsequently, the original size image data converted to an artwork is processed into JPEG in the same manner as the embodiments explained above, and the generated JPEG file is written into the first folder (step 317).

Therefore, using the thumbnail images converted to an artwork as described above, the user can see the images converted by the image processing apparatus 1 as desired in a short time. Furthermore, upon seeing the converted thumbnail images, the user can convert an original image corresponding to a thumbnail image of a favorite artwork style into an artwork, enjoy the converted image, and save the converted image.

When the user touches the CONVERT button 308 without touching ENTER button 305 and the ALL button 306 and without long-touching any one of the picture-converted images, the determinations made in step S307, step S308, and step S312 are NO, and the determination made in step S314 is YES. Therefore, the CPU 11 proceeds from step S314 to step S315 to convert the original image corresponding to the picture-converted thumbnail into an artwork, and successively displays the converted image.

More specifically, for example, it is assumed that a user touches the CONVERT button 308 in the state of FIG. 25A. In this case, there are seven picture-converted images, i.e., the gothic oil painting thumbnail Tc32, the thick oil painting thumbnail Tb33, the gothic oil painting thumbnail Tc35, the thick oil painting thumbnail Tb7, the oil painting thumbnail Ta24, the oil painting thumbnail Ta27, and the gothic oil painting thumbnail Tc42.

In this case, the following image data are generated.

1) Image data is generated by converting the original image I32 corresponding to the gothic oil painting thumbnail Tc32 into the gothic oil painting style, 2) image data is generated by converting the original image I33 corresponding to the thick oil painting thumbnail Tb33 into the thick oil painting style, 3) image data is generated by converting the original image I35 corresponding to the gothic oil painting thumbnail Tc35 into the gothic oil painting style, 4) image data is generated by converting the original image I7 corresponding to the thick oil painting thumbnail T7' into the thick oil painting style, 5) image data is generated by converting the original image I24 corresponding to the oil painting thumbnail Ta24 into the oil painting style, 6) image data is generated by converting the original image I27 corresponding to the oil painting thumbnail Ta27 into the oil painting style, and 7) image data is generated by converting the original image I42 corresponding to the gothic oil painting thumbnail Tc42 into the gothic oil painting style.

Then, the images converted to an artwork based on the image data are successively displayed (step S315) Subsequently, the image data obtained by converting the original images are processed into JPEG in the same manner as described above, and the generated JPEG files are written into the first folder (step S317).

Figure 27:
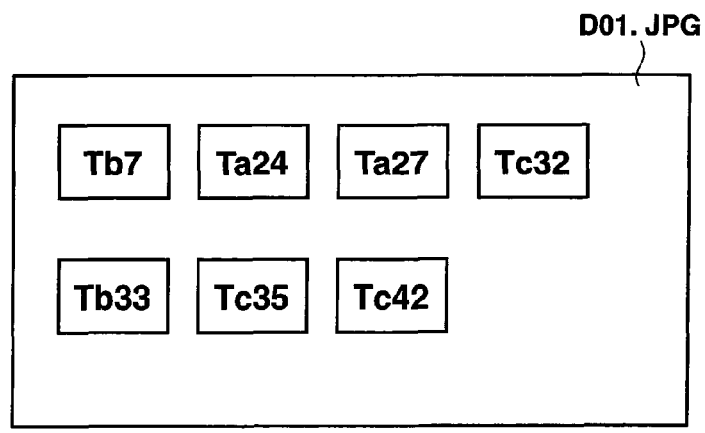
FIG. 27 is a figure illustrating the content of storage in a memory card according to a modification of the fourth embodiment.

Therefore, using the thumbnail images converted to an artwork as described above, the user can see the images converted by the image processing apparatus 1 as desired in a short time. Furthermore, upon seeing the images, the user can convert all the original images corresponding to thumbnail images of favorite artwork styles into an artwork, enjoy the converted images, and save the converted images.

shown in FIG. 25B, a single data file D00.JPG representing one screen (sixteen images) including not only the thumbnails converted to an artwork but also the original thumbnails is stored. Alternatively, as shown FIG. 27, a single image data file D01.JPG including only the picture converted thumbnails Tc32, Tb33, Tc35, Tb7, Ta24, Ta27, and Tc42 may be stored.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, a single-touch, a double-touch, and a long-touch for buttons and/or thumbnail are explained to issue various instructions to the touch panel. However, a touching manner is not limited to the above described manner and definitions of instructions issued by the single-touch, double-touch, and long-touch can be freely changed. The second and third embodiments can be modified by shifting functions except displaying function from the image processing apparatus to the server wherein the image processing apparatus merely transmits/receives data and displays the images. The present invention can be practiced as a computer readable recording medium in which a program for allowing the computer to function as predetermined means, allowing the computer to realize a predetermined function, or allowing the computer to conduct predetermined means.

What is claimed is:

1. An image display apparatus comprising:
a CPU;
a display device;
a display controller configured to control said display device under control of the CPU;
a storage configured to store image data items indicative of original images; and
a page change switch configured to accept input for changing a page displayed on the display device to a next page;
wherein:
the display controller performs first control to display reduced images of the original images on the display device;
the CPU performs first processing to, in response to an operation for specifying one of the reduced images displayed on the display device, change a tone of the specified reduced image to one of a plurality of tones;
the display controller performs second control to replace the specified reduced image displayed on the display device with a tone-changed reduced image obtained by the first processing performed by the CPU;
the display controller performs third control to replace all other reduced images which are not the tone-changed reduced image displayed on the display device with tone-unchanged reduced images for the next page in response to a page change operation input to the page change switch without replacing the tone-changed reduced image displayed on the display device;
the CPU performs second processing to, in response to an operation for specifying the tone-changed reduced image displayed on the display device, change a tone of the specified tone-changed reduced image to another tone;
the display controller performs fourth control to replace the specified tone-changed reduced image displayed on the display device with a tone-changed reduced image obtained by the second processing performed by the CPU; and
any generated tone-changed reduced images are collected and displayed on the display device even after the page change operation has been performed a plurality of times.

2. The image display apparatus according to claim 1, wherein the CPU performs third processing to, in response to an operation for specifying the tone-changed reduced image displayed on the display device, change a tone of an original image corresponding to the specified tone-changed reduced image to a same tone as the specified tone-changed reduced image.

3. The image display apparatus according to claim 2, further comprising a recording module configured to record a tone-changed original image to the storage.

4. The image display apparatus according to claim 1, wherein the CPU performs third processing to change a tone of all original images which respectively correspond to each of tone-changed reduced images displayed on the display device to a same tone as their respective tone-changed reduced images.

5. An image display method for an image display apparatus comprising a display device, a page change switch configured to accept input for changing a page displayed on the display device to a next page, and a storage configured to store image data items indicative of original images, the method comprising:
displaying reduced images of the original images on the display device;
in response to an operation for specifying one of the reduced images displayed on the display device, changing a tone of the specified reduced image to one of a plurality of tones;
replacing the specified reduced image displayed on the display device with a tone-changed reduced image;
replacing all other reduced images which are not the tone-changed reduced image displayed on the display device with tone-unchanged reduced images for the next page in response to a page change operation input to the page change switch without replacing the tone-changed reduced image displayed on the display device;
in response to an operation for specifying the tone-changed reduced image displayed on the display device, changing a tone of the specified tone-changed reduced image to another tone; and
replacing the specified tone-changed reduce image displayed on the display device with a tone-changed reduced image changed to the another tone;
wherein any generated tone-changed reduced images are collected and displayed on the display device even after the page change operation has been performed a plurality of times.

6. A non-transitory computer-readable storage medium having a program stored thereon which is executable by a computer, the computer comprising a display device, a page change switch configured to accept input for changing a page displayed on the display device to a next page, and a storage configured to store image data items indicative of original images, and the program being executable to control the computer to perform functions comprising:
displaying reduced images of the original images on the display device;

in response to an operation for specifying one of the reduced images displayed on the display device, changing a tone of the specified reduced image to one of a plurality of tones;

replacing the specified reduced image displayed on the display device with a tone-changed reduced image;

replacing all other reduced images which are not the tone-changed reduced image displayed on the display device with tone-unchanged reduced images for the next page in response to a page change operation input to the page change switch without replacing the tone-changed reduced image displayed on the display device;

in response to an operation for specifying the tone-changed reduced image displayed on the display device, changing a tone of the specified tone-changed reduced image to another tone; and replacing the specified tone-changed reduce image displayed on the display device with a tone-changed reduced image changed to the another tone;

wherein any generated tone-changed reduced images are collected and displayed on the display device even after the page change operation has been performed a plurality of times.

7. An image display apparatus comprising:

a display device;

a storage configured to store image data items indicative of original images;

a first display controller configured to display reduced images of the original images on the display device;

a processor configured to, in response to an operation performed on a display screen of the display device for specifying one of the reduced images displayed on the display device, change a tone of the specified reduced image to one of a plurality of tones;

a second display controller configured to replace the specified reduced image displayed on the display device with a tone-changed reduced image obtained by the processor;

a page advance switch configured to accept input for performing a page scroll operation to scroll a page displayed on the display device; and a third display controller configured to continue to display the reduced images displayed on the display device without replacing the tone-changed reduced image, when the reduced images displayed on the display device are scrolled in response to the page scroll operation to reveal additional tone-unchanged reduced images of the original images stored in the storage;

wherein any generated tone-changed reduced images are collected and displayed on the display device even after the page scroll operation has been performed a plurality of times.

8. The image display apparatus according to claim 7, wherein:

the processor is configured to, in response to an operation for specifying a tone-changed reduced image displayed on the display device, change a tone of the specified tone-changed reduced image to another tone; and the second display controller is configured to replace the specified tone-changed reduced image displayed on the display device with a tone-changed reduced image changed to the another tone by the processor.

9. The image display apparatus according to claim 7, wherein the processor is configured to change a tone of all tone-changed reduced images displayed on the display device to one of the plurality of tones.

10. An image display method comprising:

storing image data items indicative of original images in a storage;

displaying, on a display screen, reduced images of the original images;

in response to an operation performed on the display screen for specifying one of the reduced images displayed on the display screen, changing a tone of the specified reduced image to one of a plurality of tones;

replacing the specified reduced image displayed on the display screen with a tone-changed reduced image;

accepting input for performing a page scroll operation to scroll a page displayed on the display screen; and continuing to display the reduced images displayed on the display screen without replacing the tone-changed reduced image, when the reduced images displayed on the display screen are scrolled in response to the page scroll operation to reveal additional tone-unchanged reduced images of the stored original images;

wherein any generated tone-changed reduced images are collected and displayed on the display screen even after the page scroll operation has been performed a plurality of times.

11. A non-transitory computer-readable storage medium having a program stored thereon which is executable by a computer, the program being executable to control the computer to perform functions comprising:

storing image data items indicative of original images in a storage;

displaying, on a display screen, reduced images of the original images;

in response to an operation performed on the display screen for specifying one of the reduced images displayed on the display screen, changing a tone of the specified reduced image to one of a plurality of tones;

replacing the specified reduced image displayed on the display screen with a tone-changed reduced image;

accepting input for performing a page scroll operation to scroll a page displayed on the display screen; and continuing to display the reduced images displayed on the display screen without replacing the tone-changed reduced image, when the reduced images displayed on the display screen are scrolled in response to the page scroll operation to reveal additional tone-unchanged reduced images of the stored original images;

wherein any generated tone-changed reduced images are collected and displayed on the display screen even after the page scroll operation has been performed a plurality of times.

* * * * *